(12) United States Patent
Nishimura

(10) Patent No.: US 10,310,524 B2
(45) Date of Patent: Jun. 4, 2019

(54) ENVIRONMENTAL CONTROL APPARATUS, ENVIRONMENTAL CONTROL SYSTEM, ENVIRONMENTAL CONTROL METHOD, AND ENVIRONMENTAL CONTROL PROGRAM

(71) Applicant: Daikin Industries, Ltd., Osaka-shi, Osaka (JP)

(72) Inventor: Masaya Nishimura, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/925,095

(22) Filed: Jun. 24, 2013

(65) Prior Publication Data

US 2013/0282185 A1  Oct. 24, 2013

Related U.S. Application Data

(62) Division of application No. 11/663,457, filed as application No. PCT/JP2005/016544 on Sep. 8, 2005, now abandoned.

(30) Foreign Application Priority Data

Sep. 28, 2004  (JP) ................................ 2004-280957
Dec. 13, 2004  (JP) ................................ 2004-359663

(51) Int. Cl.
*G05D 23/19*  (2006.01)
*F24F 11/30*  (2018.01)
(Continued)

(52) U.S. Cl.
CPC .......... *G05D 23/1919* (2013.01); *F24F 11/30* (2018.01); *F24F 11/62* (2018.01);
(Continued)

(58) Field of Classification Search
CPC ................. F24F 11/0086; F24F 11/006; F24F 2011/006; F24F 11/0012;
(Continued)

(56) References Cited

U.S. PATENT DOCUMENTS 4,926,839 A * 5/1990 Sugawara et al. .............. 126/96
4,969,508 A 11/1990 Tate et al.
(Continued)

FOREIGN PATENT DOCUMENTS

CN  1081243 A  1/1994
DE  197 00 762 A1  7/1998
(Continued)

OTHER PUBLICATIONS

European Search Report of the corresponding EP Application No. 05 78 2317.1 dated May 31, 2013.

*Primary Examiner* — Jason Lin
(74) *Attorney, Agent, or Firm* — Global IP Counselors, LLP

(57) ABSTRACT

An environmental control apparatus that is installed in a room and is portable includes an input unit, a setting unit, a determination unit, and a recommendation unit. The input unit is input a fact that a room air environment is comfortable. The setting unit sets a range of a comfort zone. The determination unit determines whether the air environment of the room is within the range of the comfort zone. The recommendation unit recommend an improving method of improving the air environment of the room based on at least information about a determination result of the determination unit so that the air environment of the room falls within the range of the comfort zone.

15 Claims, 22 Drawing Sheets

(51) Int. Cl.
*F24F 11/62* (2018.01)
*F24F 110/00* (2018.01)
*F24F 110/50* (2018.01)
*F24F 120/20* (2018.01)
*F24F 11/56* (2018.01)
*F24F 11/46* (2018.01)

(52) U.S. Cl.
CPC .............. *F24F 11/46* (2018.01); *F24F 11/56* (2018.01); *F24F 2110/00* (2018.01); *F24F 2110/50* (2018.01); *F24F 2120/20* (2018.01)

(58) Field of Classification Search
CPC .. F24F 2011/0068; F24F 11/06; F24F 11/053; F24F 3/14; F24F 11/0015; F24F 11/0009; F24F 2011/0057; G05D 23/1917
USPC .................. 700/276; 236/51, 1 C, 44 C, 78 B
See application file for complete search history.

(56) References Cited

U.S. PATENT DOCUMENTS

| | | | |
|---|---|---|---|
| 5,078,316 A | | 1/1992 | Hara et al. |
| 5,086,385 A | | 2/1992 | Launey et al. |
| 5,105,366 A | * | 4/1992 | Beckey ................. 700/276 |
| 5,170,935 A | * | 12/1992 | Federspiel et al. ......... 236/44 C |
| 5,272,477 A | | 12/1993 | Tashima et al. |
| 5,762,265 A | * | 6/1998 | Kitamura et al. ............. 236/51 |
| 5,839,654 A | | 11/1998 | Weber |
| 5,927,599 A | | 7/1999 | Kath |
| 5,934,084 A | | 8/1999 | Lee |
| 6,145,751 A | | 11/2000 | Ahmed |
| 6,216,956 B1 | * | 4/2001 | Ehlers .................. F24F 11/006 236/47 |
| 6,220,039 B1 | | 4/2001 | Kensok et al. |
| 6,394,359 B1 | | 5/2002 | Morgan |
| 6,628,997 B1 | * | 9/2003 | Fox et al. ..................... 700/86 |
| 7,089,087 B2 | | 8/2006 | Dudley |
| 7,302,313 B2 | | 11/2007 | Sharp et al. |
| 7,587,262 B1 | * | 9/2009 | Pippin .................. 700/299 |
| 2003/0217143 A1 | * | 11/2003 | Dudley .................. 709/224 |
| 2003/0233172 A1 | * | 12/2003 | Granqvist .......... G05D 23/1924 700/276 |
| 2004/0118136 A1 | | 6/2004 | Patel et al. |
| 2004/0243355 A1 | | 12/2004 | Kobayashi |
| 2005/0061027 A1 | | 3/2005 | Hirakuni et al. |
| 2006/0004492 A1 | | 1/2006 | Terlson et al. |
| 2006/0100744 A1 | | 5/2006 | Sharma et al. |
| 2007/0138307 A1 | | 6/2007 | Khoo |

FOREIGN PATENT DOCUMENTS

| | | |
|---|---|---|
| JP | 63-49654 A | 3/1988 |
| JP | 2-13750 A | 1/1990 |
| JP | 3-68849 A | 3/1991 |
| JP | 3-225144 A | 10/1991 |
| JP | 4-288439 A | 10/1992 |
| JP | 6-147600 A | 5/1994 |
| JP | 6-207734 A | 7/1994 |
| JP | 7-180894 A | 7/1995 |
| JP | 8-303834 A | 11/1996 |
| JP | 2000-291990 A | 10/2000 |
| JP | 2001-355893 A | 12/2001 |
| JP | 2002-224205 A | 8/2002 |
| JP | 2002-333191 A | 11/2002 |
| JP | 2003-111157 A | 4/2003 |
| JP | 2004-53127 A | 2/2004 |
| JP | 2004-163088 A | 6/2004 |
| JP | 2004-212017 A | 7/2004 |

* cited by examiner

| <ENVIRONMENTAL FACTOR> 181 | <LOWER LIMIT> 182 | <UPPER LIMIT> 183 |
|---|---|---|
| TEMPERATURE | 20°C | 26°C |
| HUMIDITY | 40% | 70% |
| ... | ... | ... |
| DEW POINT TEMPERATURE DIFFERENTIAL | 4°C | ∞ |
| ... | ... | ... |
| DUST CONCENTRATION | 0 | 0.10 mg/m³ |
| ... | ... | ... |

| 191 ⟨ENVIRONMENTAL FACTOR⟩ | 192 ⟨LOWER LIMIT⟩ | 193 ⟨UPPER LIMIT⟩ | 194 ⟨CONTROL DETAILS⟩ |
|---|---|---|---|
| TEMPERATURE | 27°C | ∞ | AUTOMATIC OPERATION WITH SET TEMPERATURE OF 24° C |
| TEMPERATURE | -∞ | 19°C | AUTOMATIC OPERATION WITH SET TEMPERATURE OF 24° C |
| ... | ... | ... | ... |
| DEW POINT TEMPERATURE DIFFERENTIAL | 4°C | ∞ | DEHUMIDIFYING OPERATION WITH 'LOW' AIRFLOW |
| DEW POINT TEMPERATURE DIFFERENTIAL | 0°C | 4°C | DEHUMIDIFYING OPERATION WITH 'HIGH' AIRFLOW |
| DEW POINT TEMPERATURE DIFFERENTIAL | -∞ | 0°C | VENTILATING OPERATION WITH 'HIGH' AIRFLOW |
| ... | ... | ... | ... |
| DUST CONCENTRATION | 0.15 mg/m³ | ∞ | AIR CLEANING OPERATION WITH 'HIGH' AIRFLOW |
| DUST CONCENTRATION | 0.10 mg/m³ | 0.15 mg/m³ | AIR CLEANING OPERATION WITH 'LOW' AIRFLOW |
| ... | ... | ... | ... |

| 218A ENVIRONMENTAL FACTOR | 218B LOWER LIMIT | 218C UPPER LIMIT |
|---|---|---|
| TEMPERATURE | 20°C | 26°C |
| HUMIDITY | 40% | 70% |
| ⋮ | ⋮ | ⋮ |
| DEW POINT TEMPERATURE DIFFERENTIAL | 4°C | ∞ |
| ⋮ | ⋮ | ⋮ |
| $CO_2$ CONCENTRATION | 0 | 1000ppm |
| ⋮ | ⋮ | ⋮ |

| 219A | 219B | 219C | 219D |
|---|---|---|---|
| ENVIRONMENTAL FACTOR | \<LOWER LIMIT\> | \<UPPER LIMIT\> | GUIDANCE DETAILS |
| TEMPERATURE | 27°C | ∞ | PLEASE SET THE TEMPERATURE TO 24° C |
| TEMPERATURE | −∞ | 19°C | PLEASE SET THE TEMPERATURE TO 24° C |
| ... | ... | ... | ... |
| DEW POINT TEMPERATURE DIFFERENTIAL | 4°C | ∞ | PLEASE PERFORM DEHUMIDIFYING OPERATION WITH 'LOW' AIRFLOW |
| DEW POINT TEMPERATURE DIFFERENTIAL | 0°C | 4°C | PLEASE PERFORM DEHUMIDIFYING OPERATION WITH 'HIGH' AIRFLOW |
| DEW POINT TEMPERATURE DIFFERENTIAL | −∞ | 0°C | PLEASE OPEN A WINDOW FOR TWO MINUTES |
| ... | ... | ... | ... |
| CARBON DIOXIDE CONCENTRATION | 3000ppm | ∞ | PLEASE OPEN A WINDOW FOR FIVE MINUTES |
| CARBON DIOXIDE CONCENTRATION | 1550ppm | 3000ppm | PLEASE OPEN A WINDOW FOR TWO MINUTES |
| ... | ... | ... | ... |

Fig. 19

ENVIRONMENTAL CONTROL APPARATUS, ENVIRONMENTAL CONTROL SYSTEM, ENVIRONMENTAL CONTROL METHOD, AND ENVIRONMENTAL CONTROL PROGRAM

CROSS-REFERENCE TO RELATED APPLICATIONS

This application is a divisional application of U.S. patent application Ser. No. 11/663,457 filed on Mar. 22, 2007, which is a National Stage application of International Patent Application No. PCT/JP2005/016544 filed on Sep. 8, 2005, which claims priority under 35 U.S.C. § 119(a) to Japanese Patent Application Nos. 2004-280957 filed in Japan on Sep. 28, 2004 and 2004-359663 filed in Japan on Dec. 13, 2004, the entire contents of which are hereby incorporated herein by reference.

BACKGROUND OF THE INVENTION

Field of the Invention

The present invention relates to an environmental control apparatus, an environmental control system, an environmental control method, and an environmental control program.

Background Information

Apparatuses have been proposed in the past that monitor and display whether the air environment of a room is within the range of a comfort zone (e.g., Japanese Published Unexamined Patent Application No. H6-207734 (pp. 1-8, FIGS. 1-9)).

SUMMARY

However, with conventional apparatuses, although guidance is provided on whether the air environment of a room is within the range of the comfort zone, there is a risk that sufficient guidance will not be provided on specifically how to bring the air environment of the room within the range of the comfort zone. Consequently, there is a risk that the air environment of the room will not be made sufficiently comfortable.

It is an object of the present invention to provide an environmental control apparatus, an environmental control system, an environmental control method, and an environmental control program that can create a sufficiently comfortable air environment in a room.

An environmental control apparatus according to a first aspect of the invention is an environmental control apparatus that is installed in a room and is portable, comprising a sensor unit, a determination unit, and an output unit. The sensor unit senses an air environment of the room. The determination unit determines whether the air environment of the room is within the range of a comfort zone based on information about the air environment of the room. The output unit, based on at least information about the determination result of the determination unit, outputs information or a signal in order to make the air environment of the room fall within the range of the comfort zone.

With the present environmental control apparatus, the sensor unit senses the air environment of the room. The determination unit can receive information about the air environment of the room. The determination unit can determine whether the air environment of the room is within the range of the comfort zone based on information about the air environment of the room. The output unit can receive at least the information about the determination result of the determination unit or information based on the determination result of the determination unit. Based on at least the information about the determination result of the determination unit, the output unit outputs information or a signal in order to make the air environment of the room fall within the range of the comfort zone.

Accordingly, with the present environmental control apparatus, it is possible to create a sufficiently comfortable air environment in the room.

An environmental control apparatus according to a second aspect of the invention is an environmental control apparatus according to a first aspect of the invention, wherein the output unit is a send unit. Based on at least the information about the determination result of the determination unit, the send unit sends a control signal to an air conditioner so that the air environment of the room falls within the range of the comfort zone. The air conditioner conditions the air environment of the room.

With the present environmental control apparatus, the send unit can receive at least the information about the determination result of the determination unit, or information based on the determination result of the determination unit. Based on at least the information about the determination result of the determination unit, the send unit sends a control signal to the air conditioner so that the air environment of the room falls within the range of the comfort zone. Thereby, it is possible to enable the air conditioner to receive the control signal so that the air environment of the room falls within the range of the comfort zone.

Accordingly, with the present environmental control apparatus, the air conditioner can be controlled so that the air environment of the room falls within the range of the comfort zone without making the user aware of the comfort zone. Consequently, with the present environmental control apparatus, it is possible to automatically create a comfortable air environment in the room without making the user aware of such.

Furthermore, the air conditioner may be not only a regular air conditioner, but also, for example, a cooler, a heater, a ventilator, a dehumidifier, a humidifier, or an air cleaner.

An environmental control apparatus according to a third aspect of the invention is an environmental control apparatus according to a second aspect of the invention, further comprising a generation unit. The generation unit, based on at least the information about the determination result of the determination unit, generates the control signal so that the air environment of the room falls within the range of the comfort zone.

With the present environmental control apparatus, based on at least the information about the determination result of the determination unit, the generation unit generates the control signal so that the air environment of the room falls within the range of the comfort zone.

Accordingly, with the present environmental control apparatus, the air conditioner can be controlled so that the air environment of the room falls within the range of the comfort zone without making the user aware of the comfort zone. As a result, with the present environmental control apparatus, it is possible to automatically create a comfortable air environment in the room without making the user aware of such.

An environmental control apparatus according to a fourth aspect of the invention is an environmental control apparatus according to a third aspect of the invention, further comprising a calculation unit. The calculation unit calculates an amount of energy that is needed for the air conditioner to condition the air environment of the room. The generation unit generates, based on at least the information about the determination result of the determination unit, the control signal so that the amount of energy does not exceed a prescribed target upper limit value and so that the air environment of the room falls within the range of the comfort zone.

With the present environmental control apparatus, the calculation unit calculates the amount of energy needed for the air conditioner to condition the air environment of the room. The determination unit receives information about the amount of energy and further determines whether that amount of energy exceeds a prescribed target upper limit value. The generation unit receives information about the amount of energy or information about whether that amount of energy exceeds a prescribed target upper limit value. Based on at least the information about the determination result of the determination unit, the generation unit generates the control signal so that the amount of energy does not exceed the prescribed target upper limit value and so that the air environment of the room falls within the range of the comfort zone.

Accordingly, with the present environmental control apparatus, the air conditioner can be controlled so that the air environment of the room falls within the range of the comfort zone and so that the amount of energy does not exceed the target upper limit value. Consequently, with the present environmental control apparatus, it is possible to create a comfortable air environment in the room while conserving energy.

An environmental control apparatus according to a fifth aspect of the invention is an environmental control apparatus according to a first aspect of the invention, wherein the output unit is a send unit. The send unit sends the information about the determination result of the determination unit to an air conditioner. The air conditioner conditions the air environment of the room.

With the present environmental control apparatus, the send unit sends the information about the determination result of the determination unit to the air conditioner. Thereby, it is possible to enable the air conditioner to receive information about the determination result of the determination unit.

Accordingly, with the present environmental control apparatus, if the air conditioner can set the control signal so that the air environment of the room falls within the range of the comfort zone, then it is possible to enable the air conditioner to control the air environment of the room so that it falls within the range of the comfort zone without making the user aware of the comfort zone. Consequently, with the present environmental control apparatus, it is possible to automatically create a comfortable air environment in the room without making the user aware of such.

Furthermore, the air conditioner may be not only a regular air conditioner, but also, for example, a cooler, a heater, a ventilator, a dehumidifier, a humidifier, or an air cleaner.

An environmental control apparatus according to a sixth aspect of the invention is an environmental control apparatus according to a fifth aspect of the invention, further comprising a calculation unit. The calculation unit calculates an amount of energy that is needed for the air conditioner to condition the air environment of the room. The determination unit determines, based on the information about the air environment of the room, whether the amount of energy exceeds a prescribed target upper limit value and whether the air environment of the room is within the range of the comfort zone.

With the present environmental control apparatus, the calculation unit calculates the amount of energy needed for the air conditioner to condition the air environment of the room. Based on the information about the air environment of the room, the determination unit determines whether the amount of energy exceeds the prescribed target upper limit value, and whether the air environment of the room is within the range of the comfort zone.

Accordingly, with the present environmental control apparatus, it is possible to enable the air conditioner to control the air environment of the room so that it falls within the range of the comfort zone and so that the amount of energy does not exceed the target upper limit value. Consequently, with the present environmental control apparatus, it is possible to create a comfortable air environment in the room while conserving energy.

An environmental control apparatus according to a seventh aspect of the invention is an environmental control apparatus according to any of the first through sixth aspects of the invention, wherein the air environmental factor of the room is at least one of the temperature, dew point temperature differential, humidity, atmospheric pressure, airflow, toxic substance concentration, dust concentration, and negative ion concentration of the room.

With the present environmental control apparatus, the air environmental factor of the room is at least one of the temperature, the dew point temperature differential, the humidity, the atmospheric pressure, the airflow, the toxic substance concentration, the dust concentration, and the negative ion concentration of the room.

Accordingly, with the present environmental control apparatus, it is possible to finely determine whether the air environment of the room is within the range of the comfort zone. Consequently, with the present environmental control apparatus, it is possible to finely control the air conditioner so that the air environment of the room falls within the range of the comfort zone.

Furthermore, toxic substances are at least one of, for example, carbon monoxide, carbon dioxide, allergens, mites, mold, formaldehyde, organic compounds, VOCs (volatile organic compounds), and endocrine disrupters.

An environmental control apparatus according to an eighth aspect of the invention is an environmental control apparatus according to any of the first through sixth aspects of the invention, wherein the air environmental factors of the room are at least two of the temperature, dew point temperature differential, humidity, atmospheric pressure, airflow, toxic substance concentration, dust concentration, and negative ion concentration of the room. The determination unit assigns a priority order to the air environmental factors of the room, and determines whether the air environment of the room is within the range of the comfort zone based on information about the air environmental factors of the room.

With the present environmental control apparatus, the air environmental factors of the room are at least two of the temperature, the dew point temperature differential, the humidity, the atmospheric pressure, the airflow, the toxic substance concentration, the dust concentration, and the negative ion concentration of the room. The determination unit assigns a priority order to the plurality of air environmental factors of the room, and, based on the information about the plurality of air environmental factors of the room, determines whether the air environment of the room is within the range of the comfort zone.

Accordingly, with the present environmental control apparatus, it is possible to create a comfortable environment in the room while giving priority to those air environmental factors that are important.

An environmental control apparatus according to a ninth aspect of the invention is an environmental control apparatus according to any of the first through eighth aspects of the invention, further comprising an input unit and a setting unit. The input unit inputs a sense of comfort with respect to the air environment of the room. The setting unit sets the comfort zone of the air environment of the room based on information about the sense of comfort.

With the present environmental control apparatus, a sense of comfort with respect to the air environment of the room is input to the input unit. The setting unit can receive the information about the sense of comfort. The setting unit sets the comfort zone of the air environment of the room based on the information about the sense of comfort.

Accordingly, with the present environmental control apparatus, the comfort zone of the air environment of the room is set based on information about the user's sense of comfort. Consequently, with the present environmental control apparatus, the comfort zone can be set for each user. As a result, with the present environmental control apparatus, it is possible to create a comfortable air environment in the room in accordance with the user's preference.

An environmental control apparatus according to a tenth aspect of the invention is an environmental control apparatus according to a ninth aspect of the invention, further comprising a storage unit. The storage unit stores the comfort zone that was set by the setting unit.

With the present environmental control apparatus, the storage unit stores the comfort zone, which was set by the setting unit.

Accordingly, with the present environmental control apparatus, it is possible to reference information about the comfort zone that was set by the setting unit. Consequently, with the present environmental control apparatus, it is possible to generate the control signal so that the air environment of the room falls within the range of the user's preferred comfort zone.

An environmental control apparatus according to an eleventh aspect of the invention is an environmental control apparatus according to a first aspect of the invention, wherein the output unit is a recommendation unit. Based on at least the information about the determination result of the determination unit, the recommendation unit recommends a method of improving the air environment of the room so that it falls within the range of the comfort zone.

With the present environmental control apparatus, based on at least the information about the determination result of the determination unit, the recommendation unit recommends an improving method so that the air environment of the room falls within the range of the comfort zone.

Accordingly, with the present environmental control apparatus, it is possible to create a sufficiently comfortable air environment in the room.

An environmental control apparatus according to a twelfth aspect of the invention is an environmental control apparatus according to an eleventh aspect of the invention, further comprising a vocalization unit. The vocalization unit, based on information about the improving method that was recommended by the recommendation unit, reports the improving method by using speech.

With the present environmental control apparatus, based on the information about the improving method recommended by the recommendation unit, the vocalization unit reports the improving method by using speech.

Accordingly, with the present environmental control apparatus, it is possible to easily ascertain the improving method.

An environmental control apparatus according to a thirteenth aspect of the invention is an environmental control apparatus according to an eleventh aspect of the invention, further comprising a display unit. The display unit reports, based on information about the improving method that was recommended by the recommendation unit, the improving method by displaying it on a screen.

With the present environmental control apparatus, based on the information about the improving method recommended by the recommendation unit, the display unit reports the improving method by displaying it on a screen.

Accordingly, with the present environmental control apparatus, it is possible to easily ascertain the improving method.

An environmental control apparatus according to a fourteenth aspect of the invention is an environmental control apparatus according to any of the eleventh through thirteenth aspects of the invention, wherein the air environmental factor of the room is at least one of the temperature, dew point temperature differential, humidity, atmospheric pressure, airflow, toxic substance concentration, dust concentration, and negative ion concentration of the room.

With the present environmental control apparatus, the air environmental factor of the room is at least one of the temperature, the dew point temperature differential, the humidity, the atmospheric pressure, the airflow, the toxic substance concentration, the dust concentration, and the negative ion concentration of the room.

Accordingly, with the present environmental control apparatus, it is possible to finely recommend the improving method on that the air environment of the room falls within the range of the comfort zone.

Furthermore, toxic substances are at least one of for example, carbon monoxide, carbon dioxide, allergens, mites, mold, formaldehyde, organic compounds, VOCs (volatile organic compounds), and endocrine disrupters.

An environmental control apparatus according to a fifteenth aspect of the invention is an environmental control apparatus according to any of the eleventh through thirteenth aspects of the invention, wherein the air environmental factors of the room are at least two of the temperature, dew point temperature differential, humidity, atmospheric pressure, airflow, toxic substance concentration, dust concentration, and negative ion concentration of the room. The determination unit assigns a priority order to the air environmental factors of the room, and determines whether the air environment of the room is within the range of the comfort zone based on information about the air environmental factors of the room.

With the present environmental control apparatus, the air environmental factors of the room are at least two of the temperature, the dew point temperature differential, the humidity, the atmospheric pressure, the airflow, the toxic substance concentration, the dust concentration, and the negative ion concentration of the room. The determination unit assigns a priority order to the plurality of air environmental factors of the room, and, based on the information about the air environmental factors of the room, determines whether the air environment of the room is within the range of the comfort zone.

Accordingly, with the present environmental control apparatus, it is possible to create a comfortable environment in the room while giving priority to those air environmental factors that are important.

An environmental control apparatus according to a sixteenth aspect of the invention is an environmental control apparatus according to any of the eleventh through thirteenth aspects of the invention, wherein the air environmental factors of the room are at least two of the temperature, dew point temperature differential, humidity, atmospheric pressure, airflow, toxic substance concentration, dust concentration, and negative ion concentration of the room. The recommendation unit assigns a priority order to the air environmental factors of the room, and recommends, based on at least the information about the determination result of the determination unit, a method of improving the air environment of the room so that it falls within the range of the comfort zone.

With the present environmental control apparatus, the air environmental factors of the room are at least two of the temperature, the dew point temperature differential, the humidity, the atmospheric pressure, the airflow, the toxic substance concentration, the dust concentration, and the negative ion concentration of the room. The recommendation unit assigns a priority order to the plurality of air environmental factors of the room, and, based on at least the information about the determination result of the determination unit, recommends a method of improving the air environment of the room so that it falls within the range of the comfort zone.

Accordingly, with the present environmental control apparatus, if there is a plurality of improving methods, a coordinated recommendation can be made.

An environmental control apparatus according to a seventeenth aspect of the invention is an environmental control apparatus according to any of the eleventh through sixteenth aspects of the invention, wherein the improving method is at least one of a ventilation method and an operation method of an air conditioner. The air conditioner conditions the air environment of the room.

With the present environmental control apparatus, based on at least the information about the determination result of the determination unit, the recommendation unit recommends at least one of the ventilating method and the air conditioner operation method so that the air environment of the room falls within the range of the comfort zone.

Accordingly, with the present environmental control apparatus, it is possible to finely create a comfortable air environment in the room.

An environmental control apparatus according to an eighteenth aspect of the invention is an environmental control apparatus according to a seventeenth aspect of the invention, wherein the operation method of the air conditioner is an improving method for at least one of an operation mode, a set temperature, a set humidity, a set airflow, a set wind direction, an amount of dehumidification, an amount of humidification, an amount of ventilation, and an air cleaning performance of the air conditioner.

With the present environmental control apparatus, the recommendation unit can recommend, based on at least the information about the determination result of the determination unit, at least one of a ventilating method and improving method for at least one of the operation mode, the set temperature, the set humidity, the set airflow, the set wind direction, the amount of dehumidification, the amount of humidification, the amount of ventilation, and the air cleaning performance of the air conditioner so that the air environment of the room falls within the range of the comfort zone.

Accordingly, with the present environmental control apparatus, it is possible to more finely create a comfortable air environment in the room.

An environmental control apparatus according to a nineteenth aspect of the invention is an environmental control apparatus according to any of the eleventh through eighteenth aspects of the invention, further comprising an input unit and a setting unit. The input unit inputs a sense of comfort with respect to the air environment of the room. The setting unit sets the comfort zone of the air environment of the room based on information about the sense of comfort.

With the present environmental control apparatus, a sense of comfort with respect to the air environment of the room is input to the input unit. The setting unit can receive information about the sense of comfort. The setting unit sets the comfort zone of the air environment of the room based on the information about the sense of comfort. It is possible to store the information about the comfort zone set by the setting unit.

Accordingly, with the present environmental control apparatus, the comfort zone of the air environment of the room is set based on information about the user's sense of comfort. Consequently, with the present environmental control apparatus, the comfort zone can be set for each user. As a result, with the present environmental control apparatus, it is possible to create a comfortable air environment in the room in accordance with the user's preference.

An environmental control apparatus according to a twentieth aspect of the invention is an environmental control apparatus according to a nineteenth aspect of the invention, further comprising a storage unit. The storage unit stores the comfort zone that was set by the setting unit.

With the present environmental control apparatus, the storage unit stores comfort zone, which was set by the setting unit.

Accordingly, with the present environmental control apparatus, it is possible to reference information about the comfort zone that was set by the setting unit. Consequently, with the present environmental control apparatus, it is possible to recommend the improving method so that the air environment of the room falls within the range of the user's preferred comfort zone.

An environmental control system according to a twenty first aspect of the invention comprises: an environmental control apparatus according to any of the second through tenth aspects of the invention; and an air conditioner. The air conditioner, based on information received from the environmental control apparatus, conditions the air environment of the room so that the air environment of the room falls within the range of the comfort zone.

With the present environmental control system, the sensor unit of the environmental control apparatus senses the air environment of the room. The determination unit of the environmental control apparatus can receive information about the air environment of the room. Based on the information about the air environment of the room, the determination unit of the environmental control apparatus determines whether the air environment of the room is within the range of the comfort zone. The send unit of the environmental control apparatus can receive at least the information about the determination result of the determination unit, or information based on the determination result of the determination unit. Based on at least the information about the determination result of the determination unit, the send unit of the environmental control apparatus sends a control signal to the air conditioner so that the air environment of the room falls within the range of the comfort zone. The air conditioner can receive the control signal from the environmental control apparatus so that the air environment of the room falls within the range of the comfort zone. Alternatively, the send unit of the environmental control apparatus sends the information about the determination result of the determination unit to the air conditioner. The air conditioner can receive the information about the determination result of the determination unit from the environmental control apparatus. Based on the information received from the environmental control apparatus, the air conditioner conditions the air environment of the room so that it falls within the range of the comfort zone.

Consequently, with the present environmental control system, the air conditioner can be controlled so that the air environment of the room falls within the range of the comfort zone without making the user aware of the comfort zone. Alternatively, if the air conditioner can set the control signal so that the air environment of the room falls within the range of the comfort zone, then it is possible to enable the air conditioner to control the air environment of the room so that it falls within the range of the comfort zone without making the user aware of the comfort zone. Consequently, with the present environmental control system, it is possible to automatically create a comfortable air environment in the room without making the user aware of such.

Furthermore, the air conditioner may be not only a regular air conditioner, but also, for example, a cooler, a heater, a ventilator, a dehumidifier, a humidifier, or an air cleaner.

An environmental control method according to a twenty second aspect of the invention is an environmental control method wherein an apparatus, which is installed in a room and is portable, controls an air environment of the room, comprising a sensing step, a determining step and an outputting step. The air environment of the room is sensed in the sensing step. Whether the air environment of the room is within the range of a comfort zone is determined based on information about the air environment of the room in the determining step. Based on at least information about the determination result in the determining step, information or a signal in order to make the air environment of the room fall within the range of the comfort zone is output in the outputting step.

With the present environmental control method, the air environment of the room is sensed in the sensing step. Information about the air environment of the room can be received in the determining step. Whether the air environment of the room is within the range of the comfort zone is determined based on the information about the air environment of the room in the determining step. At least the information about the determination result in the determining step, or information based on the determination result of the determining step can be received in the outputting step. Based on at least the information about the determination result in the determining step, information or a signal in order to make the air environment of the room fall within the range of the comfort zone is output in the outputting step.

Accordingly, with the present environmental control apparatus, it is possible to create a sufficiently comfortable air environment in the room.

An environmental control method according to a twenty third aspect of the invention is an environmental control method according to a twenty second aspect of the invention, wherein the outputting step is amending step. Based on at least the information about the determination result in the determining step, a control signal is sent to an air conditioner so that the air environment of the room falls within the range of the comfort zone in the sending step. The air conditioner conditions the air environment of the room.

With the present environmental control method, based on at least the information about the determination result in the determining step, the control signal is sent to the air conditioner so that the air environment of the room falls within the range of the comfort zone in the sending step. Thereby, it is possible to enable the air conditioner to receive the control signal so that the air environment of the room falls within the range of the comfort zone.

Accordingly, with the present environmental control method, the air conditioner can be controlled so that the air environment of the room falls within the range of the comfort zone without making the user aware of the comfort zone. Consequently, with the present environmental control method, it is possible to automatically create a comfortable air environment in the room without making the user aware of such.

Furthermore, the air conditioner may be not only a regular air conditioner, but also, for example, a cooler, a heater, a ventilator, a dehumidifier, a humidifier, or an air cleaner.

An environmental control method according to a twenty fourth aspect of the invention is an environmental control method according to a twenty second aspect of the invention, wherein the outputting step is a sending step. The information about the determination result in the determining step is sent to an air conditioner in the sending stop. The air conditioner conditions the air environment of the room.

With the present environmental control method, the information about the determination result in the determining step is sent to the air conditioner in the sending step. Thereby, it is possible to enable the air conditioner to receive the information about the determination result in the determining step.

Accordingly, with the present environmental control method, if the air conditioner can set the control signal so that the air environment of the room falls within the range of the comfort zone, then it is possible to enable the air conditioner to control the air environment of the room so that it falls within the range of the comfort zone without making the user aware of the comfort zone. Consequently, with the present environmental control method, it is possible to automatically create a comfortable air environment in the room without making the user aware of such.

Furthermore, the air conditioner may be not only a regular air conditioner, but also, for example, a cooler, a heater, a ventilator, a dehumidifier, a humidifier, or an air cleaner.

An environmental control method according to a twenty fifth aspect of the invention is an environmental control method according to a twenty second aspect of the invention, wherein the outputting step is a recommending step. Based on at least the information about the determination result in the determining step, a method of improving the air environment of the room so that it falls within the range of the comfort zone is recommended in the recommending step.

With the present environmental control method, based on at least the information about the determination result in the determining step, a method of improving the air environment of the room so that it falls within the range of the comfort zone is recommended in the recommending step.

Accordingly, with the present environmental control method, it is possible to create a sufficiently comfortable air environment in the room.

An environmental control program according to the twenty sixth aspect of the invention is an environmental control program that causes an apparatus, which is installed in a room and is portable, to control an air environment of the room, comprising a sensing step, a determining step, and an outputting step. The air environment of the room is sensed in the sensing step. Whether the air environment of the room is within the range of a comfort zone is determined based on information about the air environment of the room in the determining step. Based on at least information about the determination result in the determining step, information or a signal in order to make the air environment of the room fall within the range of the comfort zone is output in the outputting step.

With the present environmental control program, the air environment of the room is sensed in the sensing step. Information about the air environment of the room can be received in the determining step. Whether the air environment of the room is within the range of the comfort zone is determined based on the information about the air environment of the room in the determining step. At least the information about the determination result in the determining step, or information based on the determination result in the determining step can be received in the outputting step. Based on at least the information about the determination result in the determining step, information or a signal in order to make the air environment of the room fall within the range of the comfort zone is output in the outputting step.

Accordingly, with the present environmental control apparatus, it is possible to create a sufficiently comfortable air environment in the room.

An environmental control program according to a twenty seventh aspect of the invention is an environmental control program according to a twenty sixth aspect of the invention, wherein the outputting step is a sending step. Based on at least the information about the determination result in the determining step, a control signal is sent to an air conditioner so that the air environment of the room falls within the range of the comfort zone in the sending step. The air conditioner conditions the air environment of the room.

With the present environmental control program, based on at least the information about the determination result in the determining step, the control signal is sent to the air conditioner so that the air environment of the room falls within the range of the comfort zone in the sending step. Thereby, it is possible to enable the air conditioner to receive the control signal so that the air environment of the room falls within the range of the comfort zone.

Accordingly, with the present environmental control program, the air conditioner can be controlled so that the air environment of the room falls within the range of the comfort zone without making the user aware of the comfort zone. Consequently, with the present environmental control program, it is possible to automatically create a comfortable air environment in the room without making the user aware of such.

Furthermore, the air conditioner may be not only a regular air conditioner, but also, for example, a cooler, a heater, a ventilator, a dehumidifier, humidifier, or an air cleaner.

An environmental control program according to a twenty eighth aspect of the invention is an environmental control program according to a twenty sixth aspect of the invention, wherein the outputting step is a sending step. The information about the determination result in the determining step is sent to an air conditioner in the sending step. The air conditioner conditions the air environment of the room.

With the present environmental control program, the information about the determination result in the determining step is sent to the air conditioner in the sending step. Thereby, it is possible to enable the air conditioner to receive the information about the determination result in the determining step.

Accordingly, with the present environmental control program, if the air conditioner can set the control signal so that the air environment of the room falls within the range of the comfort zone, then it is possible to enable the air conditioner to control the air environment of the room so that it falls within the range of the comfort zone without making the user aware of the comfort zone. Consequently, with the present environmental control program, it is possible to automatically create a comfortable air environment in the room without making the user aware of such.

Furthermore, the air conditioner may be not only a regular air conditioner, but also, for example, a cooler, a heater, a ventilator, a dehumidifier, a humidifier, or an air cleaner.

An environmental control program according to a twenty ninth aspect of the invention is an environmental control program according to a twenty sixth aspect of the invention, wherein the outputting step is a recommending step. Based on at least the information about the determination result in the determining step, a method of improving the air environment of the room so that it falls within the range of the comfort zone is recommended in the recommending step.

With the present environmental control program, based on at least the information about the determination result in the determining step, the method of improving the air environment of the room so that it falls within the range of the comfort zone is recommended in the recommending step.

Accordingly, with the present environmental control program, it is possible to create a sufficiently comfortable air environment in the room.

With the environmental control apparatus according to the first aspect of the invention, information or a signal is output in order to make the air environment of the room fall within the range of the comfort zone, and it is therefore possible to create a sufficiently comfortable air environment in the room.

With the environmental control apparatus according to the second aspect of the invention, a control signal is sent to the air conditioner so that the air environment of the room falls within the range of the comfort zone, and the air conditioner can therefore be controlled so that the air environment of the room falls within the range of the comfort zone without making the user aware of the comfort zone. Consequently, with the present environmental control apparatus, it is possible to automatically create a comfortable air environment in the room without making the user aware of such.

With the environmental control apparatus according to the third aspect of the invention, a control signal is generated so that the air environment of the room falls within the range of the comfort zone, and it is therefore possible for the air conditioner to be controlled so that the air environment of the room falls within the range of the comfort zone without making the user aware of the comfort zone. Consequently, with the present environmental control apparatus, it is possible to automatically create a comfortable air environment in the room without making the user aware of such.

With the environmental control apparatus according to the fourth aspect of the invention, the air conditioner can be controlled so that the amount of energy does not exceed the target upper limit value and so that the air environment of the room falls within the range of the comfort zone, and it is therefore possible to create a comfortable air environment in the room while conserving energy.

With the environmental control apparatus according to the fifth aspect of the invention, information about whether the air environment of the room is within the range of the comfort zone is sent to the air conditioner, and therefore, if the air conditioner can set the control signal so that the air environment of the room falls within the range of the comfort zone, it is possible to enable the air conditioner to control the air environment of the room so that it falls within the range of the comfort zone without making the user aware of the comfort zone. Consequently, with the present environmental control apparatus, it is possible to automatically create a comfortable air environment in the room without making the user aware of such.

With the environmental control apparatus according to the sixth aspect of the invention, it is possible to enable the air conditioner to control the amount of energy so that it does not exceed the target upper limit value and so that the air environment of the room falls within the range of the comfort zone, and it is therefore possible to create a comfortable air environment in the room while conserving energy.

With the environmental control apparatus according to a seventh aspect of the invention, it is possible to finely determine whether the air environment of the room is within the range of the comfort zone, and therefore the air conditioner can be finely controlled so that the air environment of the room falls within the range of the comfort zone.

With the environmental control apparatus according to an eighth aspect of the invention, it is possible to assign a priority order to a plurality of air environmental factors of the room and to determine whether the air environment of the room is within the range of the comfort zone, and therefore it is possible to create a comfortable environment in the room while giving priority to those air environmental factors that are important.

With the environmental control apparatus according to a ninth aspect of the invention, the comfort zone of the air environment of the room is set based on the information about the user's sense of comfort, and it is therefore possible to set the comfort zone for each user. Consequently, it is possible to create a comfortable air environment in the room in accordance with the user's preference.

With the environmental control apparatus according to a tenth aspect of the invention, the comfort zone set by the setting unit is stored, and it is therefore possible to reference the information about the comfort zone set by the setting unit. Consequently, with the present environmental control apparatus, it is possible to generate the control signal so that the air environment of the room falls within the range of the user's preferred comfort zone.

With the environmental control apparatus according to an eleventh aspect of the invention, a recommendation is made for a method of improving the air environment of the room so that it falls within the range of the comfort zone, and it is therefore possible to create a sufficiently comfortable air environment in the room.

With the environmental control apparatus according to a twelfth aspect of the invention, the improving method is reported by speech, and it is therefore possible to easily ascertain the improving method.

With the environmental control apparatus according to a thirteenth aspect of the invention, the improving method is reported by displaying it on a screen, and it is therefore possible to easily ascertain the improving method.

With the environmental control apparatus according to a fourteenth aspect of the invention, it is possible to finely determine whether the air environment of the room is within the range of the comfort zone, and therefore it is possible to finely recommend the method of improving the air environment of the room so that it falls within the range of the comfort zone.

With the environmental control apparatus according to a fifteenth aspect of the invention, it is possible to assign a priority order to a plurality of air environmental factors of the room and to determine whether the air environment of the room is within the range of the comfort zone, and therefore it is possible to create a comfortable environment in the room while giving priority to those air environmental factors that are important.

With the environmental control apparatus according to a sixteenth aspect of the invention, a priority order is assigned to a plurality of air environmental factors and a recommendation is made for a method of improving the air environment of the room so that it falls within the range of the comfort zone, and therefore, if there is a plurality of improving methods, a coordinated recommendation can be made.

With the environmental control apparatus according to a seventeenth aspect of the invention, for at least one of the ventilation method and the air conditioner operation method, a recommendation is made for a method of improving the air environment of the room so that it falls within the range of the comfort zone, and it is therefore possible to finely create a comfortable air environment in the room.

With the environmental control apparatus according to an eighteenth aspect of the invention, it is possible to recommend an improving method for at least one of the operation mode, the set temperature, the set humidity, the set airflow, the set wind direction, the amount of dehumidification, the amount of humidification, the amount of ventilation, and the air cleaning performance of the air conditioner, and it is therefore possible to finely create a comfortable air environment in the room.

With the environmental control apparatus according to a nineteenth aspect of the invention, the comfort zone of the air environment of the room is set based on the information about the user's sense of comfort, and it is therefore possible to set the comfort zone for each user. Consequently, it is possible to create a comfortable air environment in the room in accordance with the user's preference.

With the environmental control apparatus according to a twentieth aspect of the invention, the comfort zone set by the setting unit is stored, and it is therefore possible to reference the information about the comfort zone set by the setting unit. Consequently, with the present environmental control apparatus, it is possible to recommend a method of improving the air environment of the room so that it falls within the range of the user's preferred comfort zone.

With the environmental control system according to a twenty first aspect of the invention, a control signal is sent to the air conditioner so that the air environment of the room falls within the range of the comfort zone, and therefore the air conditioner can be controlled so that the air environment of the room falls within the range of the comfort zone without making the user aware of the comfort zone. Alternatively, information about whether the air environment of the room is within the range of the comfort zone is sent to the air conditioner, and therefore, if the air conditioner can set the control signal so that the air environment of the room falls within the range of the comfort zone, it is possible to enable the air conditioner to control the air environment of the room so that it falls within the range of the comfort zone without making the user aware of the comfort zone. Consequently, with the present environmental control system, it is possible to automatically create a comfortable air environment in the room without making the user aware of such.

With the environmental control method according to a twenty second aspect of the invention, information or a signal is output in order to make the air environment of the room fall within the range of the comfort zone, and it is therefore possible to create a sufficiently comfortable air environment in the room.

With the environmental control method according to a twenty third aspect of the invention, a control signal is sent to the air conditioner so that the air environment of the room falls within the range of the comfort zone, and the air conditioner can therefore be controlled so that the air environment of the room falls within the range of the comfort zone without making the user aware of the comfort zone. Consequently, with the present environmental control system, it is possible to automatically create a comfortable air environment in the room without making the user aware of such.

With the environmental control method according to a twenty fourth aspect of the invention, information about whether the air environment of the room is within the range of the comfort zone is sent to the air conditioner, and therefore, if the air conditioner can set the control signal so that the air environment of the room falls within the range of the comfort zone, it is possible to enable the air conditioner to control the air environment of the room so that it falls within the range of the comfort zone without making the user aware of the comfort zone. Consequently, with the present environmental control system, it is possible to automatically create a comfortable air environment in the room without making the user aware of such.

With the environmental control method according to a twenty fifth aspect of the invention, a recommendation is made for a method of improving the air environment of the room so that it falls within the range of the comfort zone, and it is therefore possible to create a sufficiently comfortable air environment in the room.

With the environmental control program according to a twenty sixth aspect of the invention, information or a signal is output in order to make the air environment of the room fall within the range of the comfort zone, and it is therefore possible to create a sufficiently comfortable air environment in the room.

With the environmental control program according to a twenty seventh aspect of the invention, a control signal is sent to the air conditioner so that the air environment of the room falls within the range of the comfort zone, and the air conditioner can therefore be controlled so that the air environment of the room falls within the range of the comfort zone without making the user aware of the comfort zone. Consequently, with the present environmental control system, it is possible to automatically create a comfortable air environment in the room without making the user aware of such.

With the environmental control program according to a twenty eighth aspect of the invention, information about whether the air environment of the room is within the range of the comfort zone is sent to the air conditioner, and therefore, if the air conditioner can set the control signal so that the air environment of the room falls within the range of the comfort zone, it is possible to enable the air conditioner to control the air environment of the room so that it falls within the range of the comfort zone without making the user aware of the comfort zone. Consequently, with the present environmental control system, it is possible to automatically create a comfortable air environment in the room without making the user aware of such.

With the environmental control program according to a twenty ninth aspect of the invention, a recommendation is made for a method of improving the air environment of the room so that it falls within the range of the comfort zone, and it is therefore possible to create a sufficiently comfortable air environment in the room.

BRIEF DESCRIPTION THE DRAWINGS

FIG. 4 is a conceptual diagram that shows the details of comfort zone information.

FIG. 5 is a conceptual diagram that shows the details of control information.

FIG. 18 is a conceptual diagram that shows the details of comfort zone information.

FIG. 19 is a conceptual diagram that shows the details of recommendation information.

DETAILED DESCRIPTION OF EMBODIMENTS

First Embodiment

Figure 1:
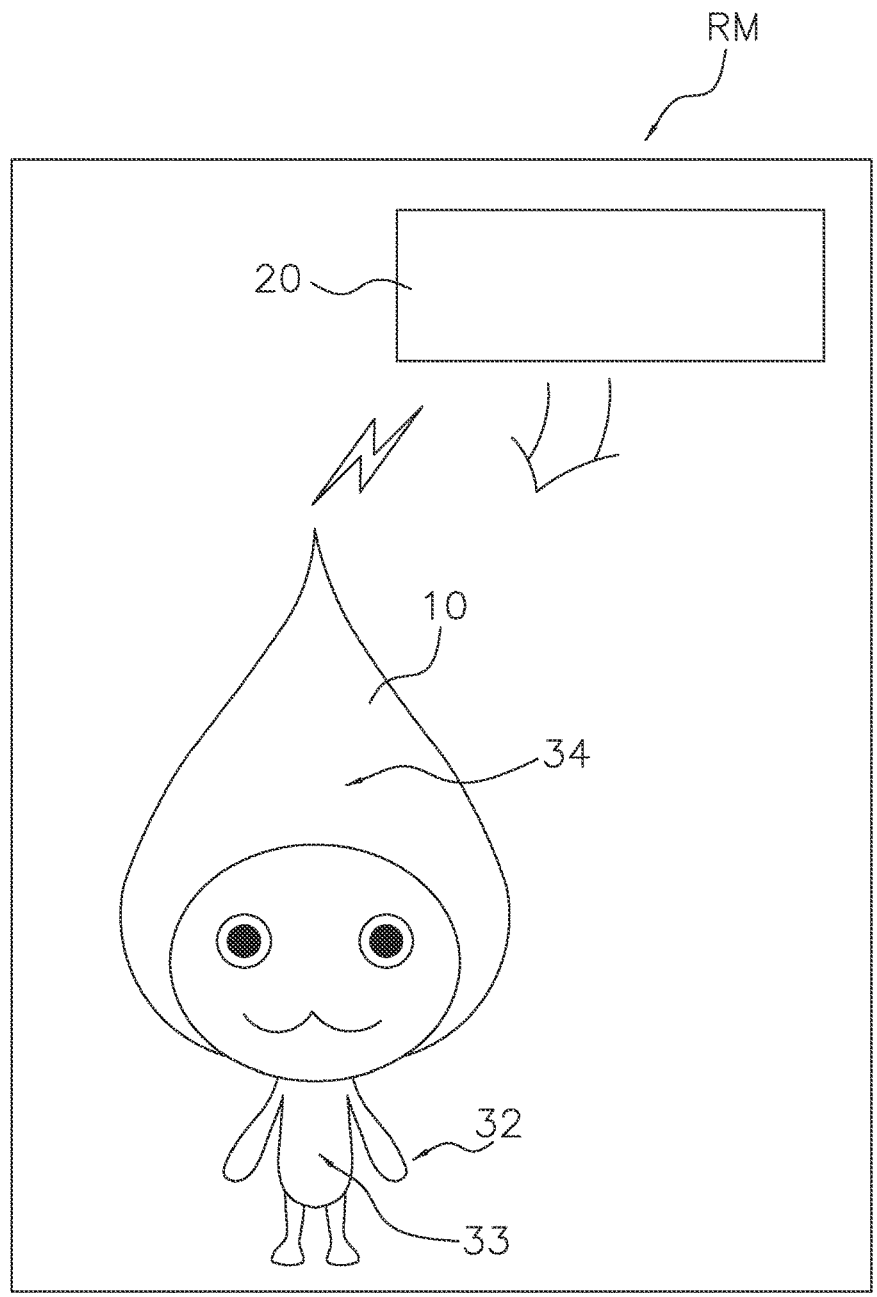
FIG. 1 is a conceptual diagram of an environmental control system according to a first embodiment of the present invention.
Figure 2:
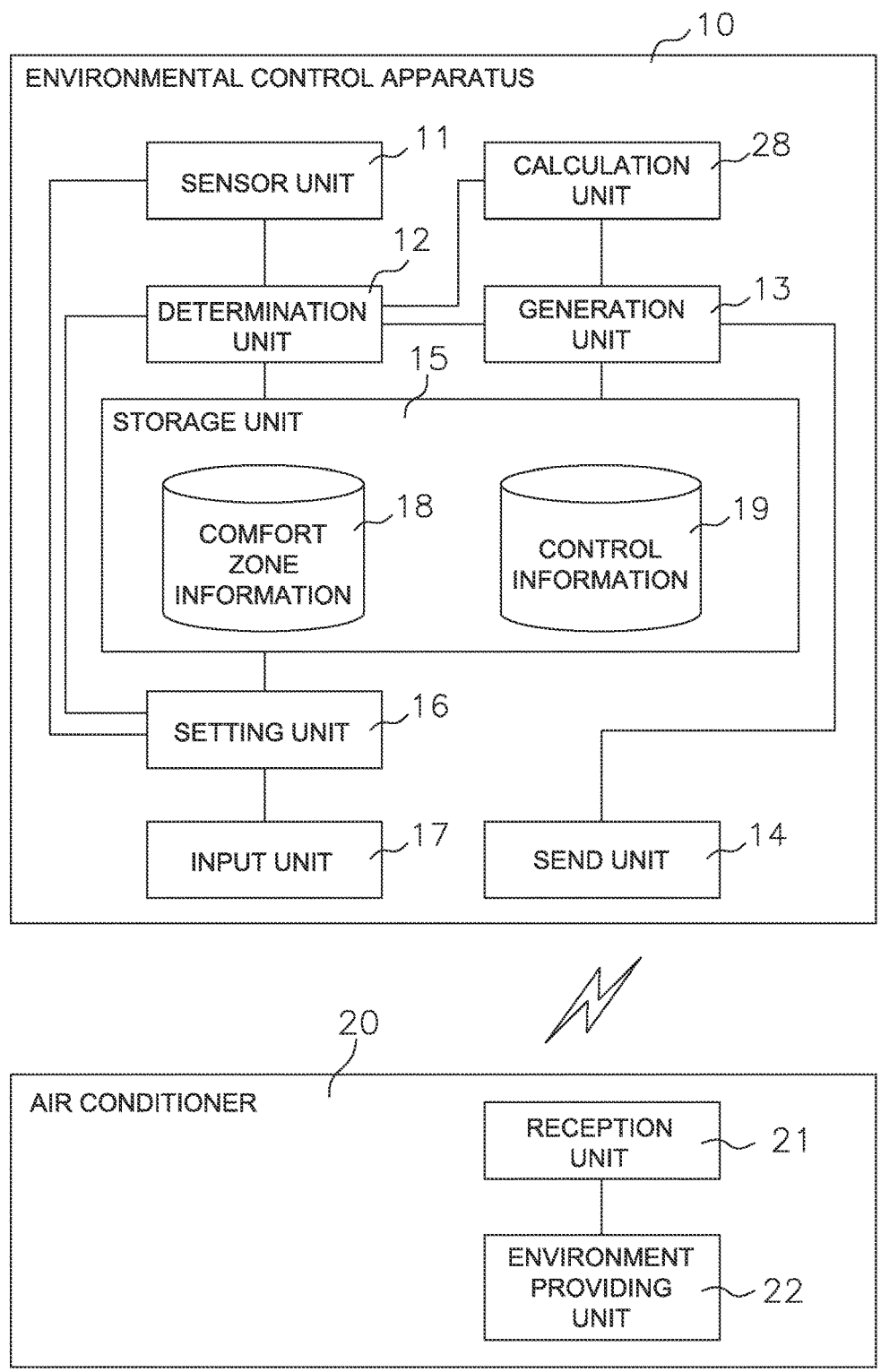
FIG. 2 is a block diagram of the environmental control sys em according to the first embodiment of the present invention.

FIG. 1 shows a conceptual diagram of an environmental control system 1 according to a first embodiment of the present invention. In addition, FIG. 2 shows a block diagram of the constituent elements of the environmental control system 1 according to the first embodiment of the present invention. The environmental control system 1 shown in FIG. 1 is principally for controlling an air conditioned environment of a room RM.

<Overall Configuration of the Environmental Control System 1>

The environmental control system 1 shown in FIG. 1 principally comprises an environmental control apparatus 10 and an air conditioner 20. The environmental control apparatus 10 is installed in the room RM and is portable. The external form of the environmental control apparatus 10 takes the form of, for example, PICHON-KUN. The air conditioner 20 principally conditions the air environment of the room RM (refer to FIG. 1).

<Configuration of the Environmental Control Apparatus 10>

As shown in FIG. 2, the environmental control apparatus shown in FIG. 1 principally comprises a sensor unit 11, a determination unit 12, a generation unit 13, a send unit 14, and a storage unit 15. The storage unit 15 principally stores comfort zone information 18 and control information 19.

The sensor unit 11 shown in FIG. 2 senses the air environment of the room RM. The determination unit 12 receives information about the air environment of the room RM from the sensor unit 11. The determination unit 12 references the storage unit 15 and acquires the comfort zone information 18. The determination unit 12 determines whether the air environment of the room RM is within a range of a comfort zone based on the information about the air environment of the room RM and the comfort zone information 18. The generation unit 13 receives both information about the determination result of the determination unit 12 and information about the air environment of the room RM from the determination unit 12. Here, information about the determination result of the determination unit 12 is information on whether the air environment of the room RM is within the range of the comfort zone. The generation unit 13 references the storage unit 15 and acquires the control information 19. Based on the information about the determination result of the determination unit 12 and the information about the air environment of the room RM, the generation unit 13 generates a control signal so that the air environment of the room RM falls within the range of the comfort zone. The send unit 14 receives control signal information from the generation unit 13. Based on the information about the determination result of the determination unit 12, the send unit 14 sends the control signal to the air conditioner 20 via a wireless circuit.

<Configuration of the Air Conditioner 20>

As shown in FIG. 2, the air conditioner 20 shown in FIG. 1 principally comprises a reception unit 21 and an environment providing unit 22.

The reception unit 21 shown in FIG. 2 receives the control signal from the environmental control apparatus 10 via the wireless circuit. The environment providing unit 22 receives the control signal from the reception unit 21. The environment providing unit 22 provides the air conditioned environment to the room RM based on the control signal.

<Configuration of the Comfort Zone Information 18>

The comfort zone information 18 shown in FIG. 2 indicates various cases in which the air environment of the room RM is within the range of the comfort zone. The comfort zone information 18 is, for example, the information shown in FIG. 4. As shown in FIG. 4, the comfort zone information 18 principally comprises an environment field 181, a tower limit field 182, and an upper limit field 183. Referencing the comfort zone information shown in FIG. 4, it can be seen that, for example, the temperature comfort zone is 20°-26° C. Alternatively, it can be seen that, for example, the humidity comfort zone is 40%-70%. Alternatively, it can be seen that, for example, the comfort zone of the dew point temperature differential is greater than or equal to 4° C. Here, the dew point temperature differential is derived by the equation below.

$$\text{Dew point temperature differential} = (\text{Room temperature}) - (\text{Dew point temperature}) \quad (1)$$

Alternatively, it can be seen that, for example, the dust concentration comfort zone is 0.10 mg/m$^3$ or less.

<Configuration of the Control Information 19>

The control information 19 shown in FIG. 2 constitutes the candidates for the contents of the control signal that is generated by the generation unit 13. The control information 19 is, for example, the information shown in FIG. 5. As shown in FIG. 5, the control information 19 principally comprises an environment field 191, a lower limit field 192, an upper limit field 193, and a control details field 194. Referencing the control information 19 shown in FIG. 5, it can be seen that, for example, a control signal to perform "automatic operation with the temperature set to 24° C." should be generated when the temperature is greater than or equal to 27° C. Alternatively, it can be seen that, for example, a control signal to perform "automatic operation with the temperature set to 24° C." should be generated when the temperature is 19° C. or less. Alternatively, it can be seen that, for example, a control signal to perform "dehumidifying operation with the airflow out to 'low'" should be generated when the dew point temperature differential is greater than or equal to 4° C. Alternatively, it can be seen that, for example, a control signal to perform "dehumidifying operation with the airflow set to 'high'" should be generated when the dew point temperature differential is 0°-4° C. Alternatively, it can be seen that, for example, a control signal to perform "ventilation operation with 'high' airflow" should be generated when the dew point temperature differential is 0° C. or less. Alternatively, it can be seen that, for example, a control signal to perform "air purification operation with 'high' airflow" should be generated when the dust concentration is greater than or equal to 0.15 mg/m$^3$. Alternatively, it can be seen that, for example, a control signal to perform "air purification operation with 'low' airflow" should be generated when the dust concentration is 0.10-0.15 mg/m$^3$.

<Flow of Process Wherein the Environmental Control System 1 Controls the Air Environment of the Room RM>

The flow of the process wherein the environmental control system 1 shown in FIG. 1 controls the air environment of the room RM will now be explained using the flow chart shown in FIG. 3.

Figure 3:
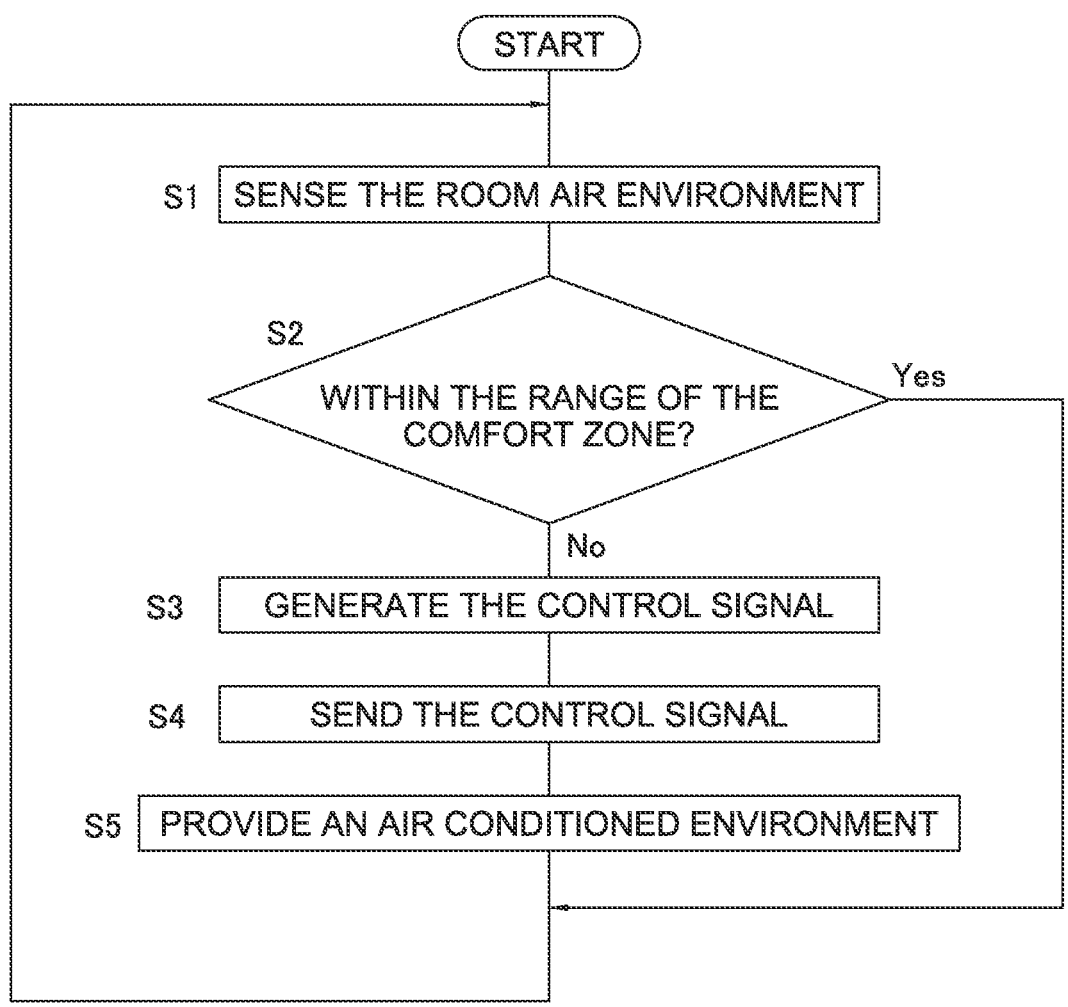
FIG. 3 is a flow chart that shows the flow of a process wherein the environmental control system controls the air environment of a room.

In step S1 shown in FIG. 3, the air environment of the room RM shown in FIG. 1 is sensed. Namely the sensor unit 11 shown in FIG. 2 senses the air environment of the room RM.

In step S2 shown in FIG. 3, it is determined whether the air environment of the room RM shown in FIG. 1 is within the range of the comfort zone. Namely, the determination unit 12 of the environmental control apparatus 10 shown in FIG. 2 receives information about the air environment of the room RM from the sensor unit 11. The determination unit 12 references the storage unit 15 and acquires the comfort zone information 18. The determination unit 12 determines whether the air environment of the room RM is within the range of the comfort zone based on the information about the air environment of the room RM and the comfort zone information 18. If the air environment of the room RM is determined to be within the range of the comfort zone, then the process proceeds to step S1; in addition, if it is determined that it is not within the range of the comfort zone, then the process proceeds to step S3.

In step S3 shown in FIG. 3, the control signal is generated. Namely, the generation unit 13 of the environmental control apparatus 10 shown in FIG. 2 receives both information about the determination result of the determination unit 12 and information about the air environment of the room RM from the determination unit 12. Here, information about the determination result of the determination unit 12 is information on whether the air environment of the room RM is within the range of the comfort zone. The generation unit 13 references the storage unit 15 and acquires the control information 19. Based on the information about the determination result of the determination unit 12 as well as the information about the air environment of the room RM, the generation unit 13 generates a control signal so that the air environment of the room RM falls within the range of the comfort zone.

In step S4 shown in FIG. 3, the control signal is sent. Namely, the send unit 14 of the environmental control apparatus 10 shown in FIG. 2 receives the control signal information from the generation unit 13. Based on the information about the determination result of the determination unit 12, the send unit 14 sends the control signal to the air conditioner 20 via the wireless circuit. The reception unit 21 of the air conditioner 20 shown in FIG. 2 receives the control signal from the environmental control apparatus 10 via the wireless circuit. The environment providing unit 22 receives the control signal from the reception unit 21.

In step S5 shown in FIG. 3, an air conditioned environment is provided. Namely, the environment providing unit 22 of the air conditioner 20 shown in FIG. 2 provides the air conditioned environment to the room RM based on the control signal.

<Features Related to the Environmental Control System 1>

(1) Here, the sensor unit 11 shown in FIG. 2 senses the air environment of the room RM. The determination unit 12 receives information about the air environment of the room RM from the sensor unit 11. The determination unit 12 determines whether the air environment of the room RM is within the range of the comfort zone based on the information about the air environment of the room RM and the comfort zone information 18. The generation unit 13 receives information about the determination result of the determination unit 12 and information about the air environment of the room RM from the determination unit 12. Based on the information about the determination result of the determination unit 12 and the information about the air environment of the room RM, the generation unit 13 generates the control signal so that the air environment of the room RM falls within the range of the comfort zone. The send unit 14 receives the control signal information from the generation unit 13. Based on the information about the determination result of the determination unit 12, the send unit 14 sends the control signal via the wireless circuit so that the air environment of the room RM falls within the range of the comfort zone. Thereby, the air conditioner 20 receives the control signal via the wireless circuit so that the air environment of the room RM falls within the range of the comfort zone.

Accordingly, the control signal is sent to the air conditioner 20 so that the air environment of the room RM falls within the range of the comfort zone, and it is therefore possible to control the air conditioner 20 so that the air environment of the room RM falls within the range of the comfort zone without making the user (not shown) aware of the comfort zone. Consequently, the air environment of the room RM can be made automatically comfortable without making the user aware of such.

(2) Here, the air environmental factors of the room RM shown in FIG. 1 are the temperature, the dew point temperature differential, the humidity, and the dust concentration of the room RM (refer to 4).

Accordingly, it is possible to finely determine whether the air environment of the room RM shown in FIG. 1 is within the range of the comfort zone, which makes it possible to finely control the air conditioner 20 so that the air environment of the room RM falls within the range of the comfort zone.

Modified Examples of the First Embodiment (A) The air environmental factor of the room RM shown in FIG. 1 may be at least one of the temperature, the dew point temperature differential, the humidity, the atmospheric pressure, the airflow, the toxic substance concentration, the dust concentration, and the negative ion concentration of the room RM. Here, toxic substances may be at least one of, for example, carbon monoxide, carbon dioxide, allergens, mites, mold, formaldehyde, organic compounds, VOCs (volatile organic compounds) and endocrine disrupters. The sensor unit 11 shown in FIG. 2 may sense the dew point temperature differential of the room RM by measuring the temperature, the humidity, and the atmospheric pressure of the room RM, deriving the dew point temperature of the room RM therefrom, and then deriving the dew point temperature differential of the room RM. In addition, the sensor unit 11 shown in FIG. 2 may sense the temperature, the humidity, and the atmospheric pressure of the room RM, and the determination unit 12 may then predict the weather based on that information and thereby determine whether the air environment of the room RM is within the range of the comfort zone while taking that weather prediction into consideration. In addition, the generation unit 13 may also generate the control signal while taking the weather prediction into consideration. In this case, it is possible to more finely determine whether the air environment of the room RM shown in FIG. 1 is within the range of the comfort zone, and to more finely control the air conditioner 20 so that the air environment of the room RM is within the range of the comfort zone.

The information about the air environment of the room RM, which was sensed by the sensor unit 11, may be accumulated in the storage unit 15. Furthermore, the information about the air environment of the room RM, which is stored in the storage unit 15, may be analyzed. Thereby, it is possible to predict changes in the air environment of the room RM and to control the air conditioner 20 so that the air environment of the room RM falls within the range of the comfort zone.

Based on only the information about the determination result of the determination unit 12, the generation unit 13 shown in FIG. 2 may generate the control signal so that the air environment of the room RM falls within the range of the comfort zone. In this case, the lower limit field 192 and the upper limit field 193 shown in FIG. 5 may be absent. If the air environment deviates from the comfort zone, whether on the high side or on the low side, then the details for which guidance must be provided are stored in the control details field 194.

(B) The air environmental factors of the room RM shown in FIG. 1 may be at least two of the temperature, the dew point temperature differential, the humidity, the atmospheric pressure, the airflow, the toxic substance concentration, the dust concentration, and the negative ion concentration of the room RM. Here, toxic substances may be at least one of, for example, carbon monoxide, carbon dioxide, allergens, mites, mold, formaldehyde, organic compounds, VOCs (volatile organic compounds) and endocrine disrupters. In this case, the determination unit 12 shown in FIG. 2 may assign a priority order to the plurality of air environmental factors of the room RM, and may determine whether the air environment of the room RM is within the range of the comfort zone based on information about the air environment of the room RM and the comfort zone information 18. For example, if the priority order is the temperature of the room RM and the dew point temperature differential of the room RM in that order, then, as long as the temperature of the room RM is within the range of the comfort zone, the determination unit 12 determines that the air environment of the room RM is within the range of the comfort zone even if the dew point temperature differential of the room RM is not within the range of the comfort zone. Thereby, it is possible to create a comfortable environment in the room RM while giving priority to those air environmental factors of the room RM that are important (e.g., the temperature of the room RM).

(C) The air environmental factors of the room RM shown in FIG. 1 may be at least two of the temperature, the dew point temperature differential, the humidity, the atmospheric pressure, the airflow, the toxic substance concentration, the dust concentration, and the negative ion concentration of the room RM. Here, toxic substances may be at least one of, for example, carbon monoxide, carbon dioxide, allergens, mites, mold, formaldehyde, organic compounds, VOCs (volatile organic compounds) and endocrine disrupters. In this case, the generation unit 13 shown in FIG. 2 may assign a priority order to the plurality of air environmental factors of the room RM, and, based on the information about the determination result of the determination unit 12 and the information about the air environment of the room RM, may generate the control signal so that the air environment of the room RM falls within the range of the comfort zone. Let us consider an example of a case wherein the priority order is the temperature of the room RM and the dew point temperature differential of the room RM in that order. As shown in FIG. 5, a control signal to perform "automatic operation with the temperature set to 24° C." is generated if the room RM temperature is 19° C. or less. Moreover, a control signal to perform "ventilation operation with 'high' airflow" is generated if the dew point temperature differential of the room RM is 0° C. less. In this case, if ventilation is forcibly performed even though the room RM temperature is below the comfort zone, then the temperature of the room RM will fall even further below the comfort zone. Accordingly, the generation unit 13 generates the control signal based only on the control detail of "automatic operation with the temperature set to 24° C." instead of "ventilation operation with 'high' airflow." Accordingly, a priority order is assigned to a plurality of air environmental factors and a control signal is generated so that the air environment of the room RM falls within the range of the comfort zone, and therefore, if there is a plurality of control details, the control signal can be generated by adjusting such.

(D) The details of the control signal generated by the generation unit 13 shown in FIG. 2 may be at least one of the operation mode, the set temperature, the set humidity, the set airflow, the set wind direction, the amount of dehumidification, the amount of humidification, the amount of ventilation, and the air cleaning performance of the air conditioner 20. Accordingly, it is possible to generate a control signal for at least one of the operation mode, the set temperature, the set humidity, the set airflow, the set wind direction, the amount of dehumidification, the amount of humidification, the amount of ventilation, and the air cleaning performance of the air conditioner 20, and it is therefore possible to finely create a comfortable air environment in the room RM.

(E) As shown in FIG. 2, the environmental control apparatus 10 shown in FIG. 1 may comprise a setting unit 16 and an input unit 17. Namely, a sense of comfort with respect to the air environment of the room RM is input to the input unit 17. The setting unit 16 receives the information about the sense of comfort from the input unit 17. The setting unit 16 sets the comfort zone of the air environment of the room RM based on the information about the sense of comfort. The storage unit 15 receives the information about the comfort zone, which was set by the setting unit 16, from the setting unit 16. The storage unit 15 stores the comfort zone, which was set by the setting unit 16. Namely, the setting unit 16 overwrites the comfort zone information 18 of the storage unit 15 by replacing the default information with the comfort zone information set by the setting unit 16.

The fact that the environment is comfortable may be input to the input unit 17 by, for example, pressing a forehead 34 or a stomach 33, or by shaking a hand 32 of the environmental control apparatus 10 (PICHON-KUN) shown in FIG. 1. Alternatively, such an input may be made to the input unit 17 by saying, for example, "I'm comfortable," via a voice device such as a microphone. The present embodiment differs from the first embodiment on these points.

Figure 6:
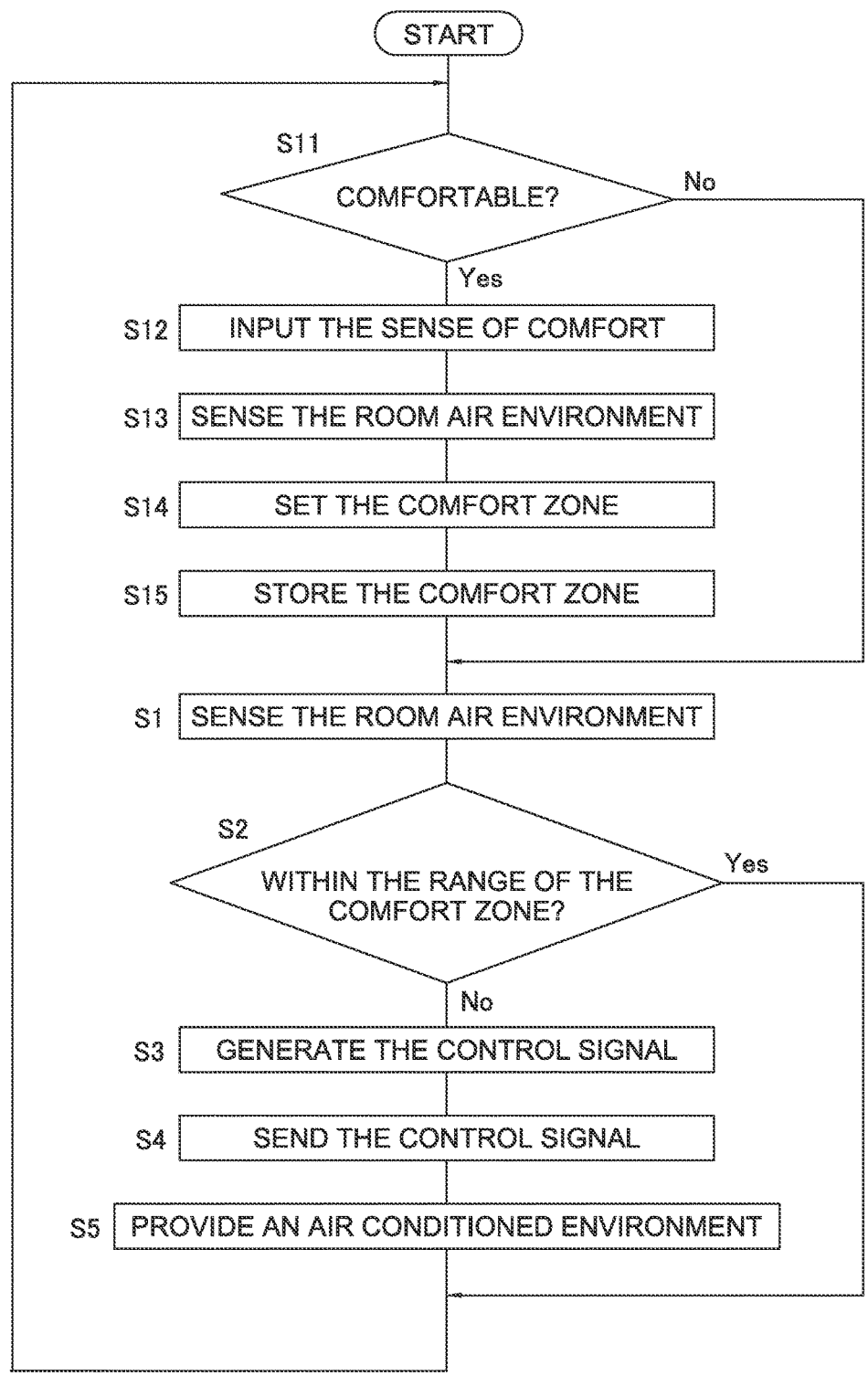
FIG. 6 is a flow chart that shows the flow of a process wherein the environmental control system controls the air environment based on the input of a sense of comfort index of the room.

In addition, as shown in FIG. 6, the flow of the process wherein the environmental control system 1 shown in FIG. 1 controls the air environment of the room RM differs from the first embodiment on the following points. Furthermore, processes in the flow chart shown in FIG. 6 that are the same as those shown in FIG. 3 are assigned the same symbols, and the explanation thereof is omitted.

In step S11 shown in FIG. 6, the user of the environmental control apparatus 10 shown in FIG. 1 determines whether the air environment of the room RM is comfortable. The process proceeds to step S12 if it is determined that it is comfortable, or proceeds to step S1 if it is determined that it is not comfortable.

In step S12 shown in FIG. 6, the user of the environmental control apparatus 10 shown in FIG. 1 inputs the sense of comfort for the air environment of the room RM. Namely, the sense of comfort with respect to the air environment of the room RM is input to the input unit 17 of the environmental control apparatus 10 shown in FIG. 2. The setting unit 16 receives the information about the sense of comfort from the input unit 17.

In step S13 shown in FIG. 6, the air environment of the room RM shown in FIG. 1 is sensed. Namely, the sensor unit 11 of the environmental control apparatus 10 shown in FIG. 2 senses the air environment of the room RM. The setting unit 16 receives the information about the air environment of the room RM from the sensor unit 11.

In step S14 shown in FIG. 6, the comfort zone of the air environment of the room RM shown in FIG. 1 is set. Namely, the setting unit 16 shown in FIG. 2 sets the comfort zone of the air environment of the room RM based on the information about the sense of comfort. For example, if it is comfortable when the temperature of the room RM is 21° C., then the center of the zone of 20°-26° C. (refer to FIG. 4), which is the temperature comfort zone of the room RM, is shifted from 23° C. to 21° C., and the temperature comfort zone of the room RM is set to 18°-24° C.

In step S15 shown in FIG. 6, the comfort zone of the air environment of the room RM shown in FIG. 1 is stored. Namely, the storage unit 15 shown in FIG. 2 receives the information about the comfort zone, which was set by the setting unit 16, from the setting unit 16. The storage unit 15 stores the comfort zone that was set by the setting unit 16. Namely, the storage unit 15 overwrites the comfort zone information 18 by replacing the default information with the comfort zone information set by the setting unit 16.

Accordingly, the comfort zone of the air environment of the room RM shown in FIG. 1 is set based on the information about the user's sense of comfort, and it is therefore possible to determine the comfort zone for each user. Consequently, it is possible to create a comfortable air environment in the room RM in accordance with the user's preference. In addition, the comfort zone set by the setting unit 16 (refer to FIG. 2) is stored, and it is therefore possible to reference the information about the comfort zone set by the setting unit 16. Consequently, it is possible to generate the control signal so that the air environment of the room RM falls within the range of the user's preferred comfort zone.

Furthermore, step S15 shown in FIG. 6 may be omitted. In this case, the comfort zone is modified only when the sense of comfort is input to the input unit 17 shown in FIG. 2, and, at other times, the comfort zone information 18 is set to the default information about the comfort zone. In this case, the comfort zone information 18 remains set to the default information and is not overwritten. The comfort zone information set by the setting unit 16 is passed to the determination unit 12 without going through the storage unit 15.

In addition, if it is determined in step S11 shown in FIG. 6 that the air environment is not comfortable, then the fact that the environment is uncomfortable may be input to the input unit 17 shown in FIG. 2. In this case, the setting unit 16 may set the comfort zone of the air environment of the room RM so that it deviates from the air environment considered to be uncomfortable.

(F) As shown in FIG. 2, the environmental control apparatus 10 shown in FIG. 1 may comprise a calculation unit 28.

In this case, the calculation unit 28 receives information about the air environment of the room RM from the determination unit 12. The calculation unit 28 calculates the amount of energy needed for the air conditioner 20 to condition the air environment of the room RM. Here, the amount of energy is the amount of electric power. The determination unit 12 receives information about the amount of energy from the calculation unit 28 and further determines whether that amount of energy exceeds a prescribed target upper limit value. The generation unit 13 receives information about whether the amount of energy exceeds the prescribed target upper limit value from the determination unit 12. If the generation unit 13 receives information to the effect that the amount of energy exceeds the prescribed target upper limit value, then it modifies the control signal by modifying the control details. Namely, based on the information about the determination result of the determination unit 12, the generation unit 13 generates the control signal so that the amount of energy does not exceed the prescribed target upper limit value and an that the air environment of the room falls within the range of the comfort zone. The present embodiment differs from the first embodiment on these points.

Figure 7:
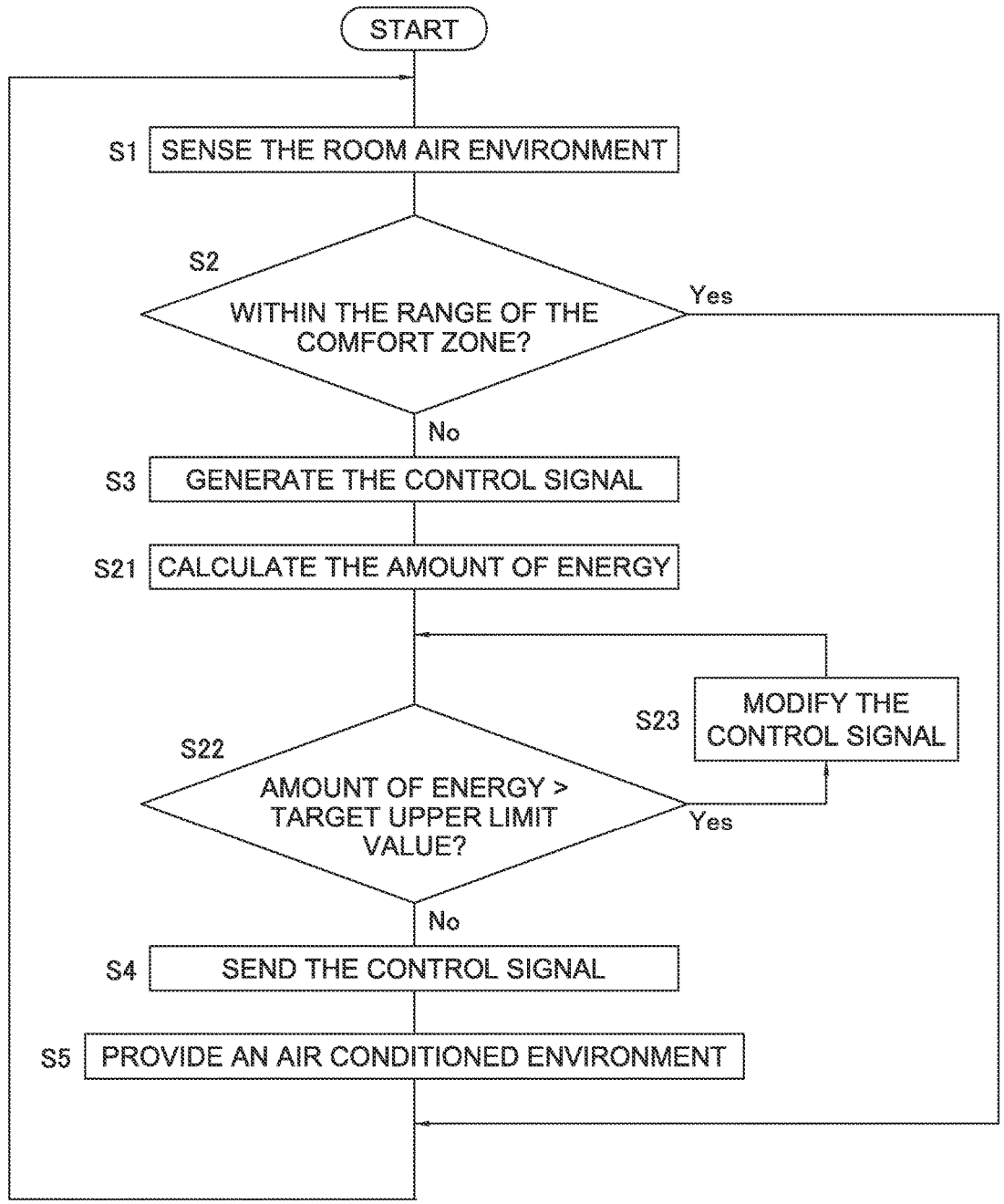
FIG. 7 is a flow chart that shows the flow of a process wherein the environmental control system controls the air environment while taking the energy consumption of the room into consideration.

In addition, as shown in FIG. 7, the flow of the process wherein the environmental control system 1 shown in FIG. 1 controls the air environment of the room RM differs from the first embodiment on the following points. Furthermore, processes in the flow chart shown in FIG. 7 that are the same as those shown in FIG. 3 are assigned the same symbols, and the explanation thereof is omitted.

In step S21 shown in FIG. 7, the needed amount of energy is calculated. Namely, the calculation unit 28 of the environmental control apparatus 10 shown in FIG. 2 receives information about the air environment of the room RM from the determination unit 12. The calculation unit 28 calculates the amount of energy needed for the air conditioner 20 to condition the air environment of the room RM. The determination unit 12 receives the information about the amount of energy from the calculation unit 28.

In step S22 shown in FIG. 7, the determination unit 12 shown in FIG. 2 determines whether the amount of energy exceeds the prescribed target upper limit value. If it is determined that the amount of energy exceeds the prescribed target upper limit value, then the process proceeds to step S23 shown in FIG. 7, or, if it is determined that the amount of energy does not exceed the prescribed target upper limit value, then the process proceeds to step S4.

In step S23 shown in FIG. 7, the control signal is modified. Namely, the generation unit 13 of the environmental control apparatus 10 shown in FIG. 2 receives information to the effect that the amount of energy exceeds the prescribed target upper limit value. The generation unit 13 modifies the control signal by modifying the control details.

Accordingly, the air conditioner 20 can be controlled so that the amount of energy does not exceed the target upper limit value and so that the air environment of the room RM shown in FIG. 1 falls within the range of the comfort zone, and it is therefore possible to create a comfortable air environment in the room RM while conserving energy.

Furthermore, the determination of step S22 shown in FIG. 7 may be made by the generation unit 13. In this case, in step S21 shown in FIG. 7, the generation unit 13 receives information about the amount of energy from the calculation unit 28. The amount of energy may be at least one of, for example, the amount of electric power, the amount of gas, the amount of water, and the amount of petroleum (gasoline and the like).

Figure 8:
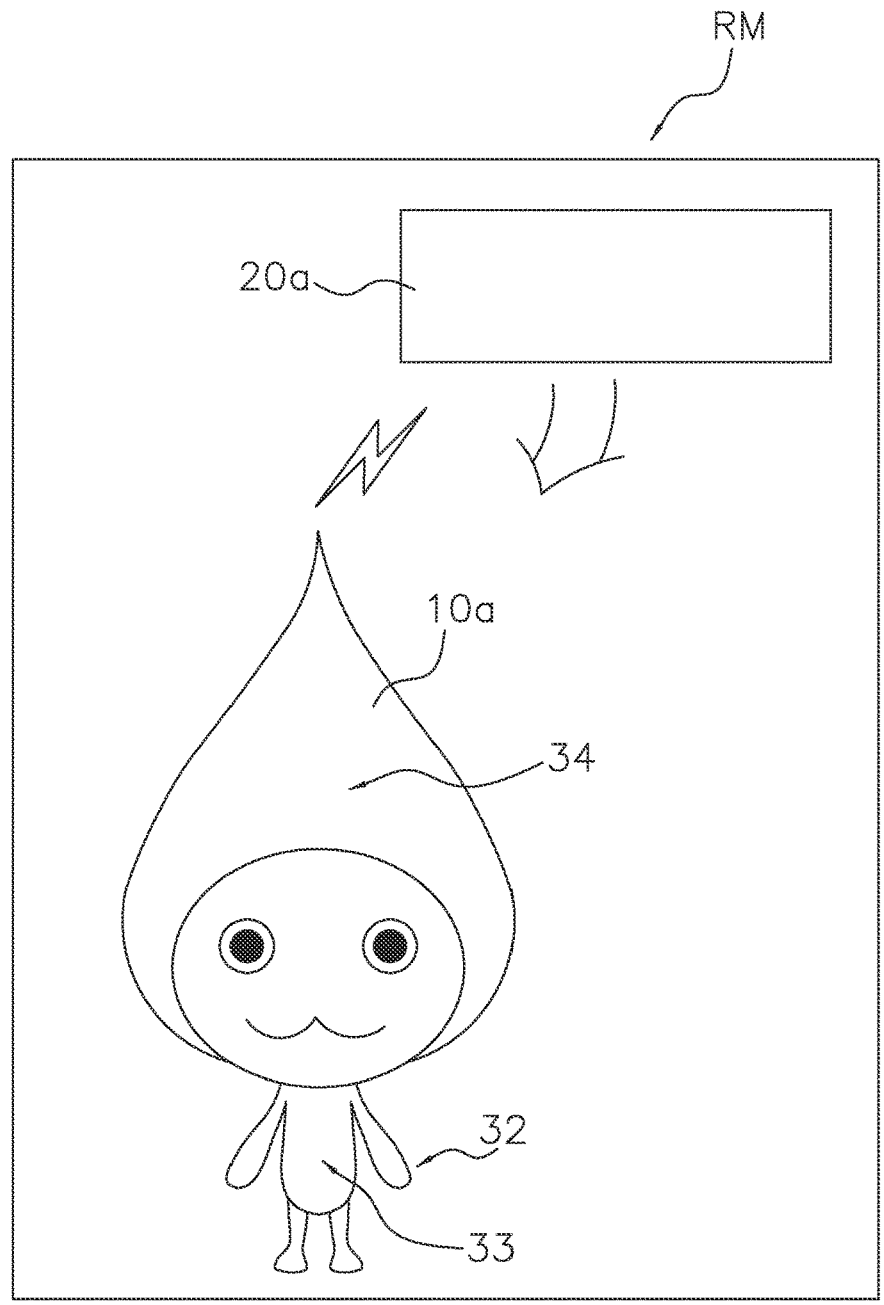
FIG. 8 is a conceptual diagram of the environmental control system according to a modified example of the first embodiment of the present invention.
Figure 9:
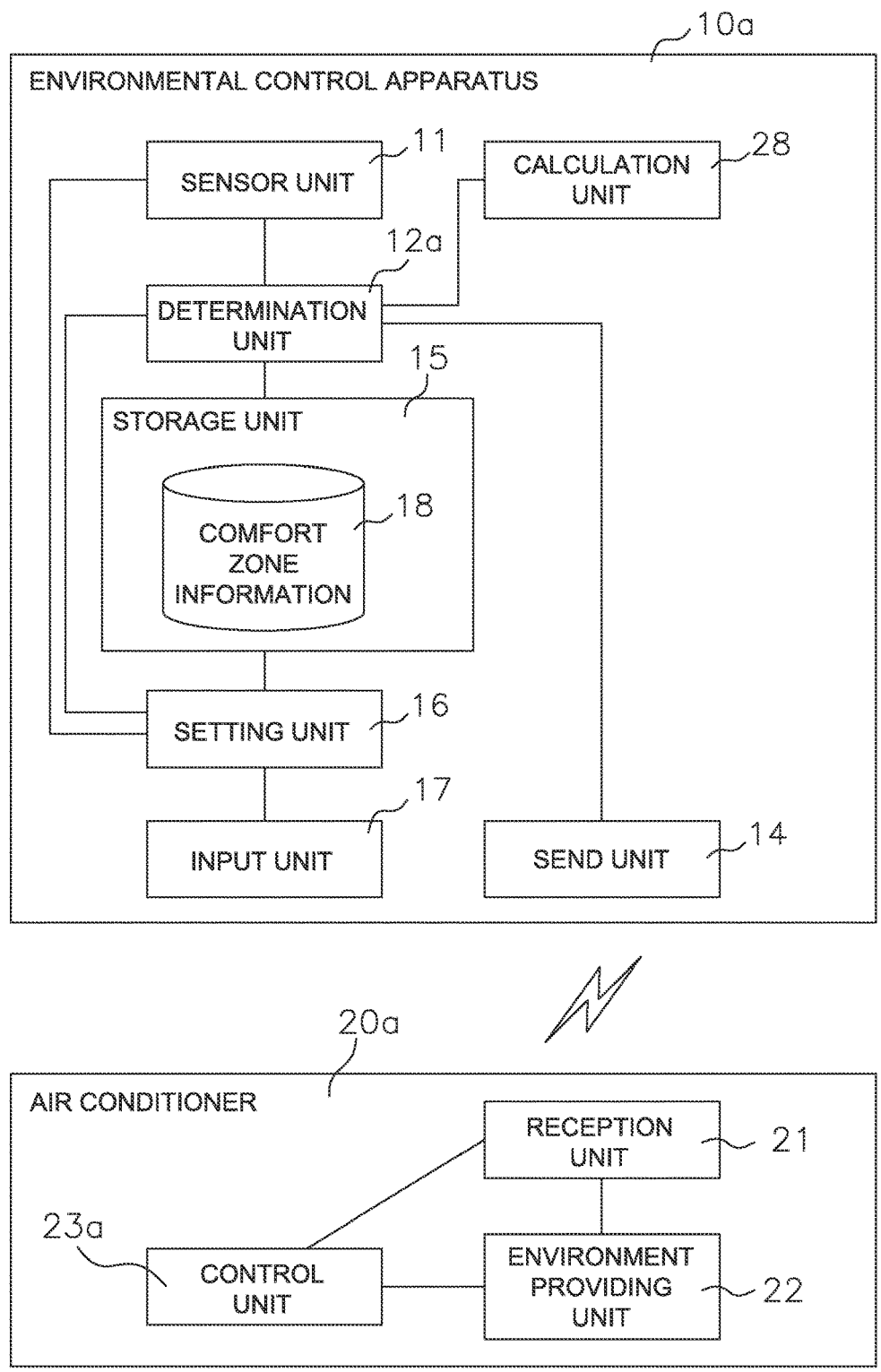
FIG. 9 is a block diagram of the environmental control system according to a modified example of the first embodiment of the present invention.

(G) As shown in FIG. 8, an environmental control system 1a may comprise an environmental control apparatus 10a and an air conditioner 20a. As shown in FIG. 9, the environmental control apparatus 10a may also be constituted without the generation unit 13 (refer to FIG. 2). The air conditioner 20a may comprise a control unit 23a. In this case, the send unit 14 receives information about the determination result of a determination unit 12a from the determination unit 12a. The send unit 14 sends the information about the determination result of the determination unit 12a to the air conditioner 20a via a wireless circuit. The reception unit 21 of the air conditioner 20a receives information about the determination result of the determination unit 12a from the environmental control apparatus 10a via the wireless circuit. The control unit 23a of the air conditioner 20a receives information about the determination result of the determination unit 12a from the reception unit 21, and generates a control signal so that the air environment of the room RM (refer to FIG. 8) falls within the range of the comfort zone. The environment providing unit 22 receives the control signal from the control unit 23a and provides the room RM with an air conditioned environment based on that control signal. The present embodiment differs from the first embodiment on these points.

Figure 10:
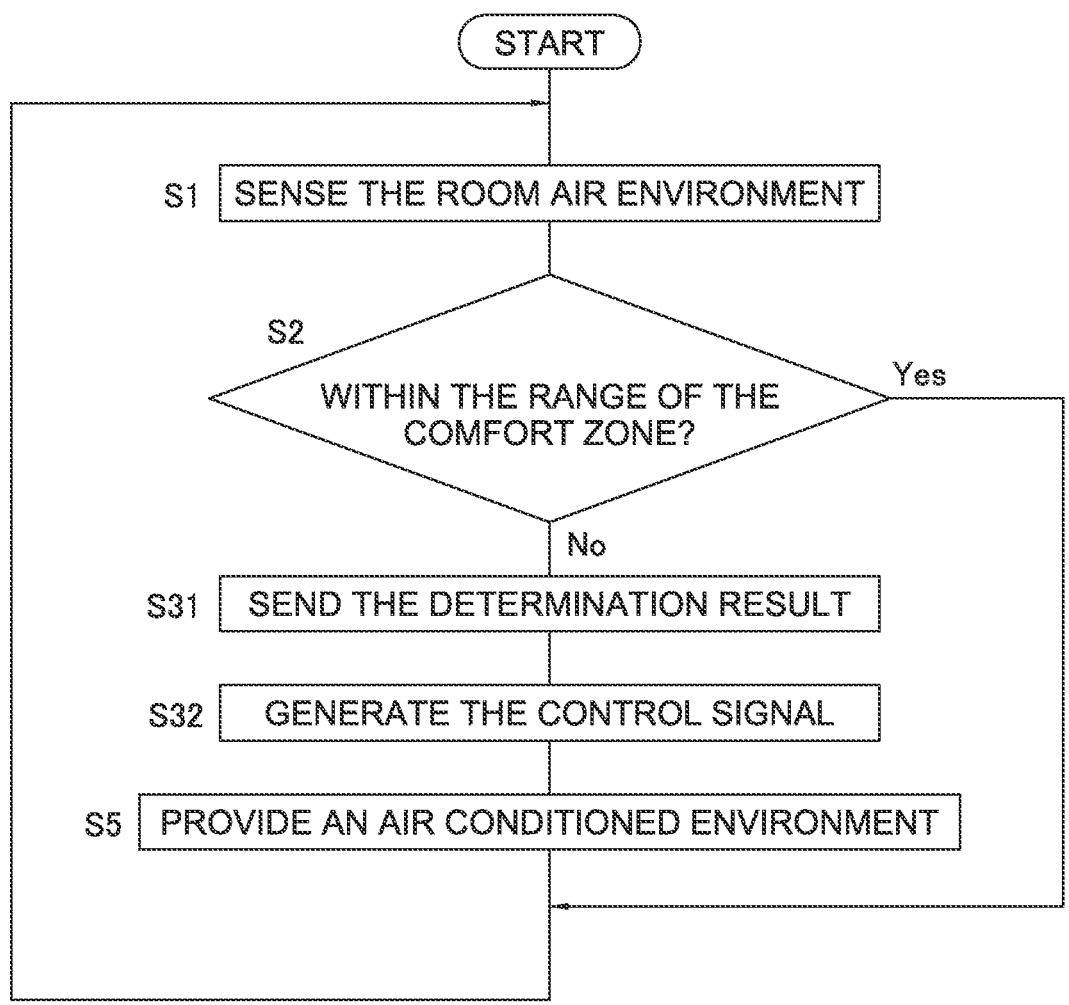
FIG. 10 is a flow chart that shows the flow of a process wherein the environmental control system controls the air environment of a room RM (modified example).

In addition, as shown in FIG. 10, the flow of the process wherein the environmental control system 1a shown in FIG. 8 controls the air environment of the room RM differs from the first embodiment on the following points. Processes in the flow chart shown in FIG. 10 that are the same as those shown in FIG. 3 are assigned the same symbols, and the explanation thereof is omitted.

In step S31 shown in FIG. 10, the information about the determination result is sent. Namely the send unit 14 of the environmental control apparatus 10a shown in FIG. 9 receives the information about the determination result of the determination unit 12a from the determination unit 12a. The send unit 14 sends the information about the determination result of the determination unit 12a to the air conditioner 20a via the wireless circuit.

In step S32 shown in FIG. 10, the control signal is generated. Namely, the reception unit 21 of the air conditioner 20a shown in FIG. 9 receives the information about the determination result of the determination unit 12a from the environmental control apparatus 10a via the wireless circuit. The control unit 23a of the air conditioner 20a receives the information about the determination result of the determination unit 12a from the reception unit 21, and generates a control signal so that the air environment of the room RM falls within the range of the comfort zone. The environment providing unit 22 receives the control signal from the control unit 23a.

Accordingly, information about whether the air environment of the room RM shown in FIG. 8 is within the range of the comfort zone is sent to the air conditioner 20a, and it is therefore possible for the air conditioner 20a to set the control signal so that the air environment of the room RM falls within the range of the comfort zone. Consequently, it is possible to enable the air conditioner 20a to control the air environment of the room RM so that it falls within the range of the comfort zone without making the user aware of the comfort zone. As a result, it is possible to automatically create a comfortable air environment in the room RM without making the user aware of such.

(H) In the modified example (G) of the first embodiment, the environmental control apparatus 10a may further comprise the calculation unit 28. In this case, the calculation unit 28 calculates the amount of energy that is needed for the air conditioner 20a to condition the air environment of the room RM. The determination unit 12a receives the information about the amount of energy from the calculation unit 28. Based on the information about the air environment of the room RM, the determination unit 12a determines whether the amount of energy exceeds the prescribed target upper limit value, and whether the air environment of the room RM is within the range of the comfort zone. The present embodiment differs from the modified example (G) of the first embodiment on these points. Accordingly, it is possible enable the air conditioner 20a to control the amount of energy so that it does not exceed the target upper limit value and so that the air environment of the room RM falls within the range of the comfort zone, and it is therefore possible to create a comfortable air environment in the room RM while conserving energy.

Information is sent from the environmental control apparatus 10 shown in FIG. 1 to the air conditioner 20 via a wireless circuit, which may use infrared rays or electromagnetic waves. Instead of sending the information from the environmental control apparatus 10 to the air conditioner 20 via the wireless circuit, the information may be sent via a wired circuit. If the information is sent via a wired circuit, then the connection between the environmental control apparatus 10 and the wired circuit may be cut when the environmental control apparatus 10 is transported. At this time, the environmental control apparatus 10 and the air conditioner 20 may be further connected by a wireless circuit. The air conditioner 20 may be not only a regular air conditioner, but also, for example, a cooler, a heater, a ventilator, a dehumidifier, a humidifier, or an air cleaner. There may be a plurality of air conditioners 20. The air conditioner 20 may be at least one of for example, a regular air conditioner, a cooler, a heater, a ventilator, a dehumidifier, a humidifier, or an air cleaner. The external form of the environmental control apparatus 10 need not be that of PICHON-KUN. For example, as long as it is portable, it may be: a stuffed animal; a folding chair, a table, or the like; a picture frame with a picture in it, or the like; or a desk lamp, a pencil box, or the like.

Second Embodiment

Figure 11:
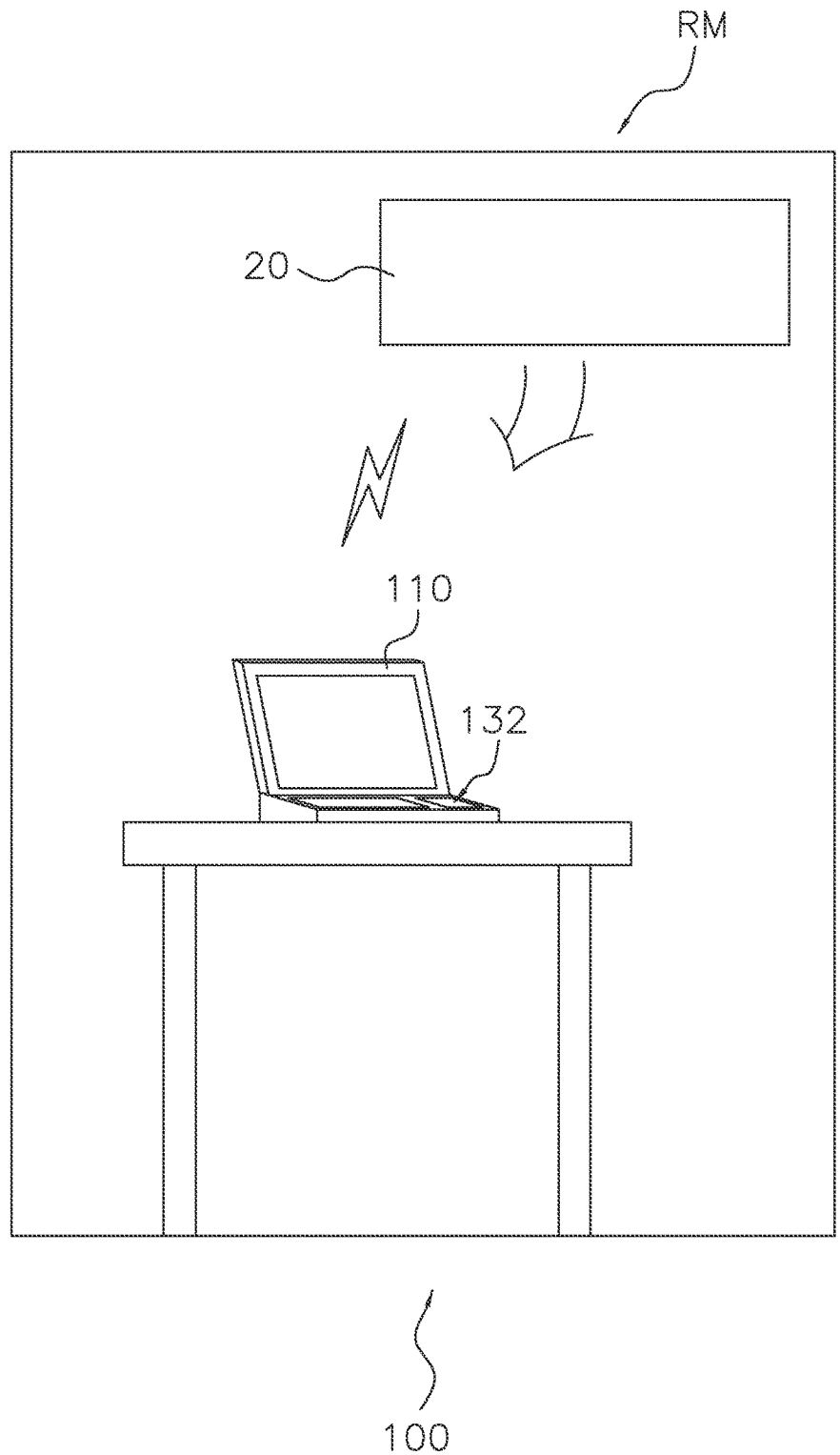
FIG. 11 is a conceptual diagram of an environmental control system according to a second embodiment of the present invention.
Figure 12:
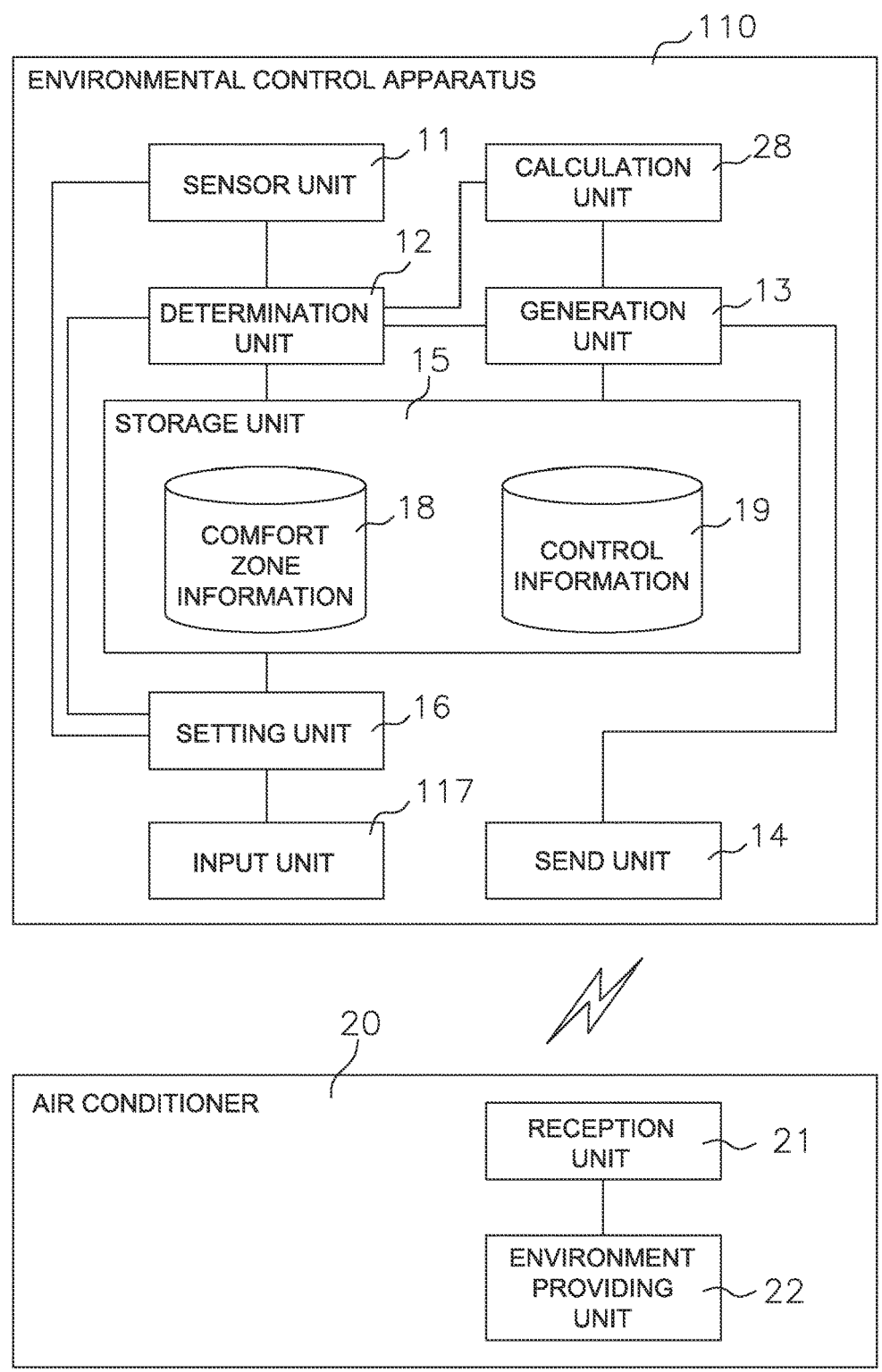
FIG. 12 is a block diagram of the environmental control system according to the second embodiment of the present invention.

FIG. 11 shows a conceptual diagram of an environmental control system 100 according to the second embodiment of the present invention. In addition, FIG. 12 shows a block diagram of the constituent elements of the environmental control system 100 according to the second embodiment of the present invention. Constituent elements of the environmental control system 100 in FIG. 11 and FIG. 12 that are the same as those of the environmental control system 1 in FIG. 1 and FIG. 2 are assigned the same reference numbers. The environmental control system 100 shown in FIG. 11 is principally for the purpose of controlling the air conditioned environment of the room RM. An environmental control apparatus 110 is installed in the room RM and is portable.

As shown in FIG. 11 and FIG. 12, the environmental control system 100 has the same basic structure as that of the first embodiment and its constituent elements are the same as those in FIG. 2, but, as shown in FIG. 11, differs from the first embodiment in that the environmental control apparatus 10 of the first embodiment is a mobile information terminal, such as a notebook computer, in the present embodiment.

The control signal is sent to the air conditioner 20 so that the air environment of the room RM (refer to FIG. 11) falls within the range of the comfort zone, and it is therefore possible to control the air conditioner 20 so that the air environment falls within the range of the comfort zone without making the user aware of the comfort zone; the first embodiment is same on this point. Accordingly, such an environmental control system 100 can also automatically create a comfortable air environment in the room RM without making the user aware of such.

Modified Example of the Second Embodiment (A) An input unit 117 shown in FIG. 12 may be a keyboard 132, which is shown in FIG. 11. In this case, detailed information about the sense of comfort with respect to the air environment of the room RM can be input. In addition, the environmental control apparatus 110 may be a mobile information terminal other than a notebook computer. For example, as long as it is portable, it may be a mobile telephone or an electronic organizer.

Figure 13:
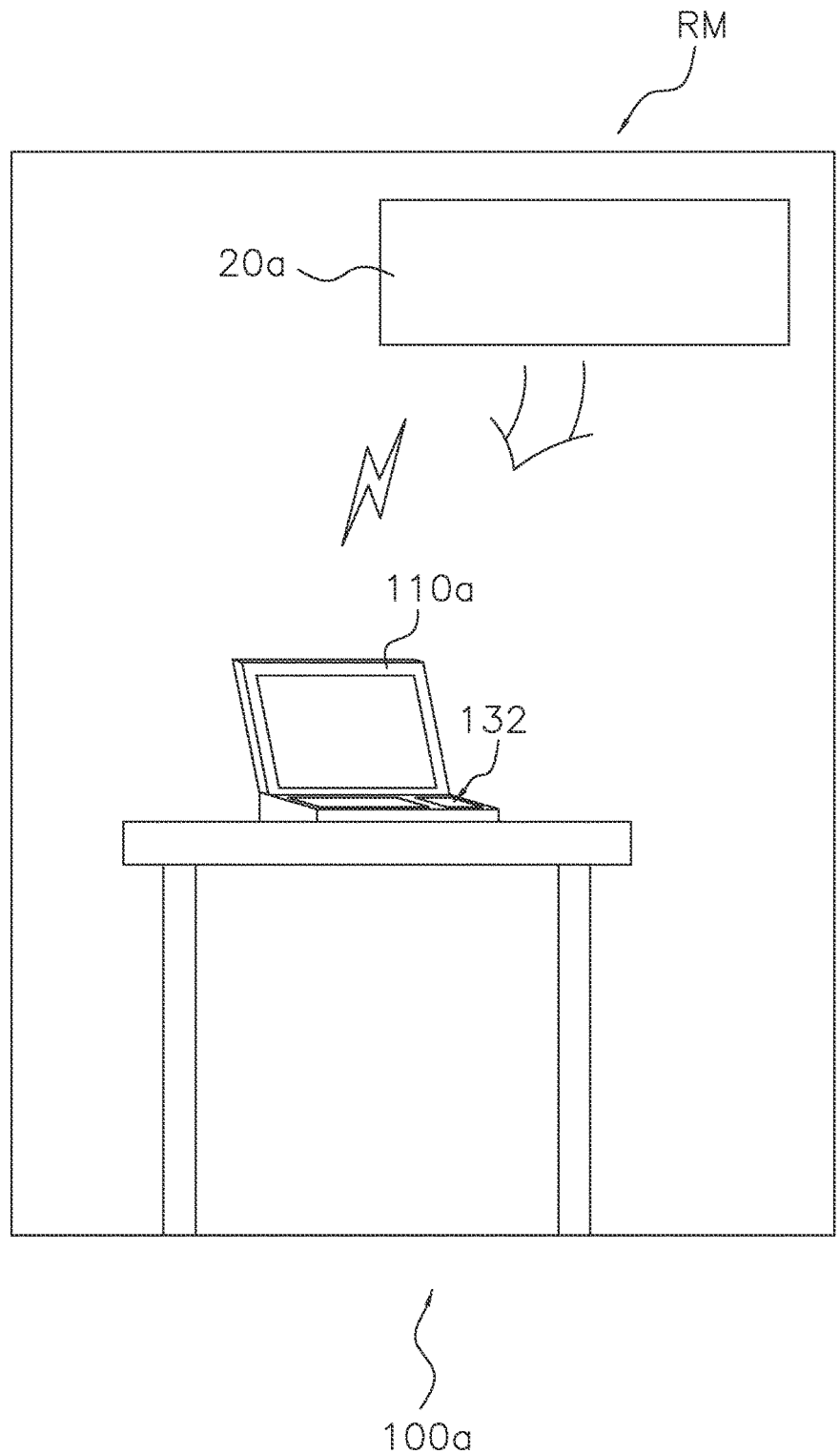
FIG. 13 is a conceptual diagram of the environmental control system according to a modified example of the second embodiment of the present invention.
Figure 14:
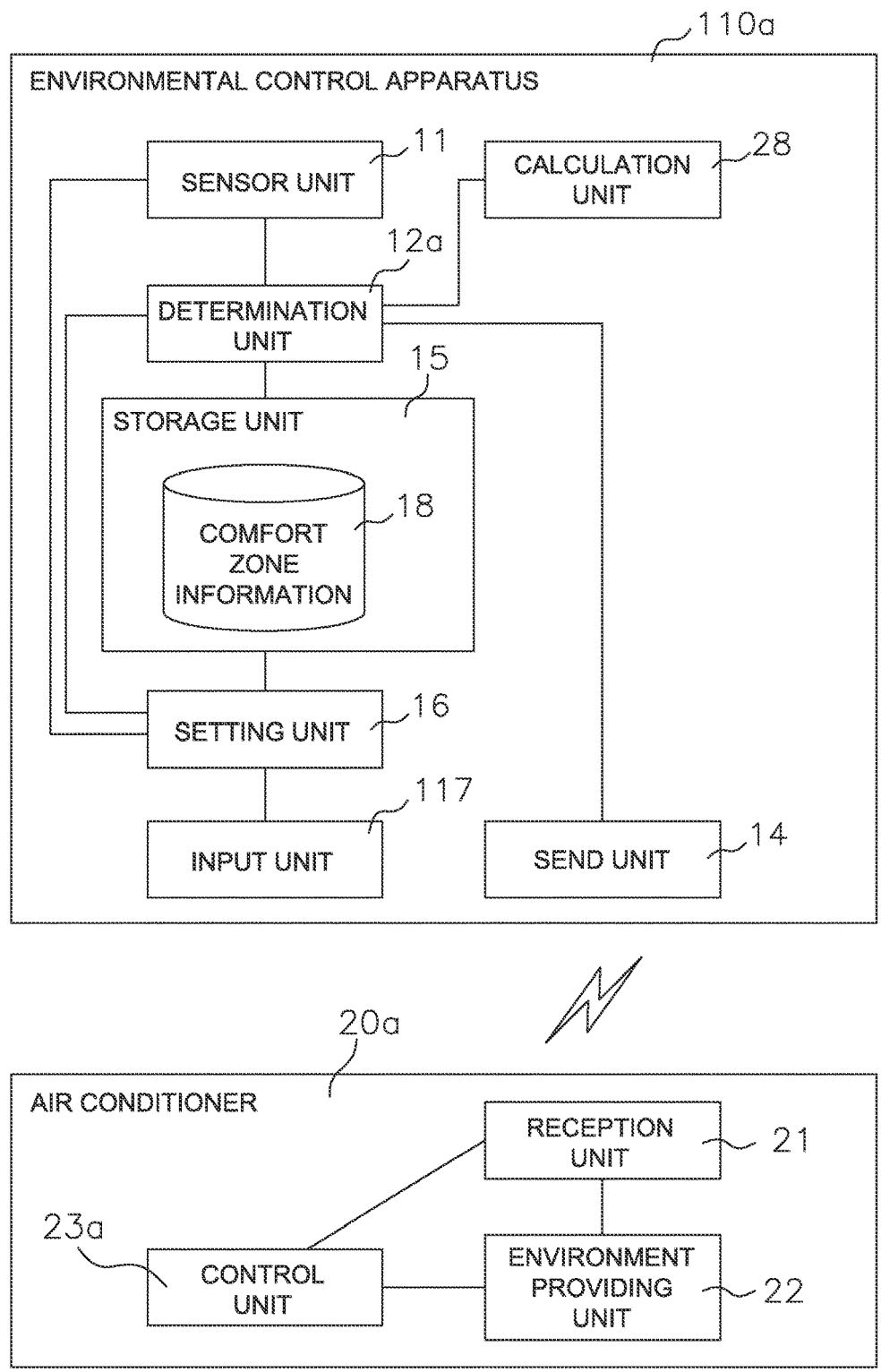
FIG. 14 is a block diagram of the environmental control system according to a modified example of the second embodiment of the present invention.

(B) As shown in FIG. 13, an environmental control system 100a may comprise an environmental control apparatus 110a and the air conditioner 20a. As shown in FIG. 14, the environmental control apparatus 110a may be constituted without the generation unit 13 (refer to FIG. 12). The air conditioner 20a may comprise the control unit 23a. In this case, the send unit 14 receives the information about the determination result of the determination unit 12a from the determination unit 12a. The send unit 14 sends the information about the determination result of the determination unit 12a to the air conditioner 20a via the wireless circuit. The reception unit 21 of the air conditioner 20a receives the information about the determination result of the determination unit 12a from the environmental control apparatus 110a via the wireless circuit. The control unit 23a of the air conditioner 20a receives the information about the determination result of the determination unit 12a from the reception unit 21, and generates a control signal so that the air environment of the room RM (refer to FIG. 13) falls within the range of the comfort zone. The environment providing unit 22 receives the control signal from the control unit 23a and provides the air conditioned environment to the room RM based on the control signal. The present embodiment differs from the first embodiment on these points.

In addition, the flow of the process wherein the environmental control system 100a shown in FIG. 13 controls the air environment of the room RM is the same as that in the modified example (G) of the first embodiment (refer to FIG. 10).

Accordingly, the information about whether the air environment of the room RM shown in FIG. 13 is within the range of the comfort zone is sent to the air conditioner 20a, and it is therefore possible for the air conditioner 20a to set the control signal so that the air environment of the room RM falls within the range of the comfort zone. Consequently it is possible to enable the air conditioner 20a to control the air environment of the room RM that it falls within the range of the comfort zone without making the user aware of such. As a result, it is possible to automatically create a comfortable air environment in the room RM without making the user aware of such.

(C) As shown in FIG. 14, the environmental control apparatus 110a in the modified example (B) of the second embodiment shown in FIG. 13 may further comprise the calculation unit 28. In this case, the calculation unit 28 calculates the amount of energy needed for the air conditioner 20a to condition the air environment of the room RM. The determination unit 12a receives information about the amount of energy from the calculation unit 28. Based on the information about the air environment of the room RM, the determination unit 12a determines whether the amount of energy exceeds the prescribed target upper limit value and whether the air environment of the room RM is within the range of the comfort zone. The present embodiment differs from the modified example (B) of the second embodiment on these points. Accordingly, it is possible to enable the air conditioner 20a to control the amount of energy so that it does not exceed the target upper limit value and so that the air environment of the room RM (refer to FIG. 13) falls within the range of the comfort zone, and it is therefore possible to create a comfortable air environment in the room RM while conserving energy.

Third Embodiment

Figure 15:
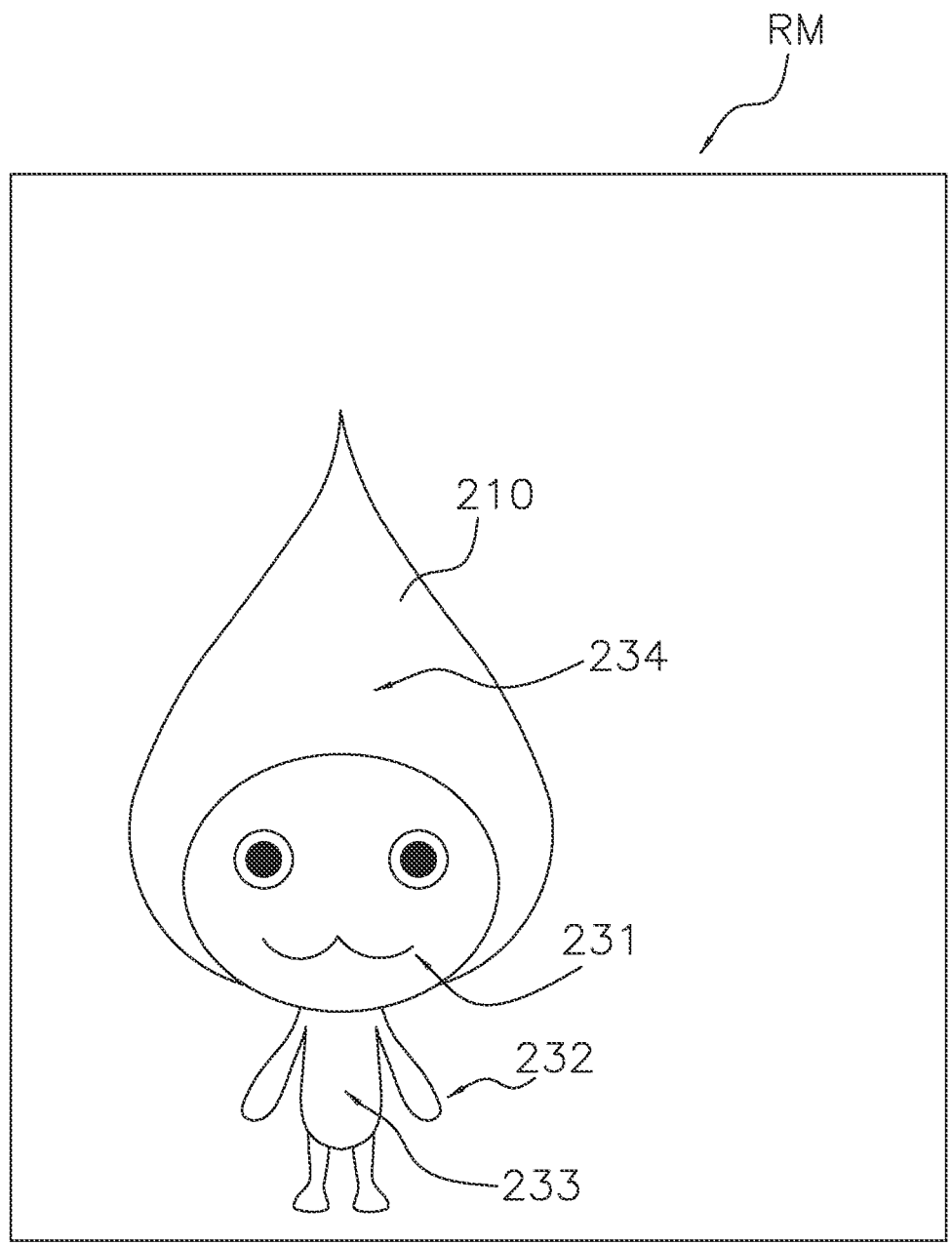
FIG. 15 is a conceptual diagram of an environmental guidance apparatus according to a third embodiment of the present invention.
Figure 16:
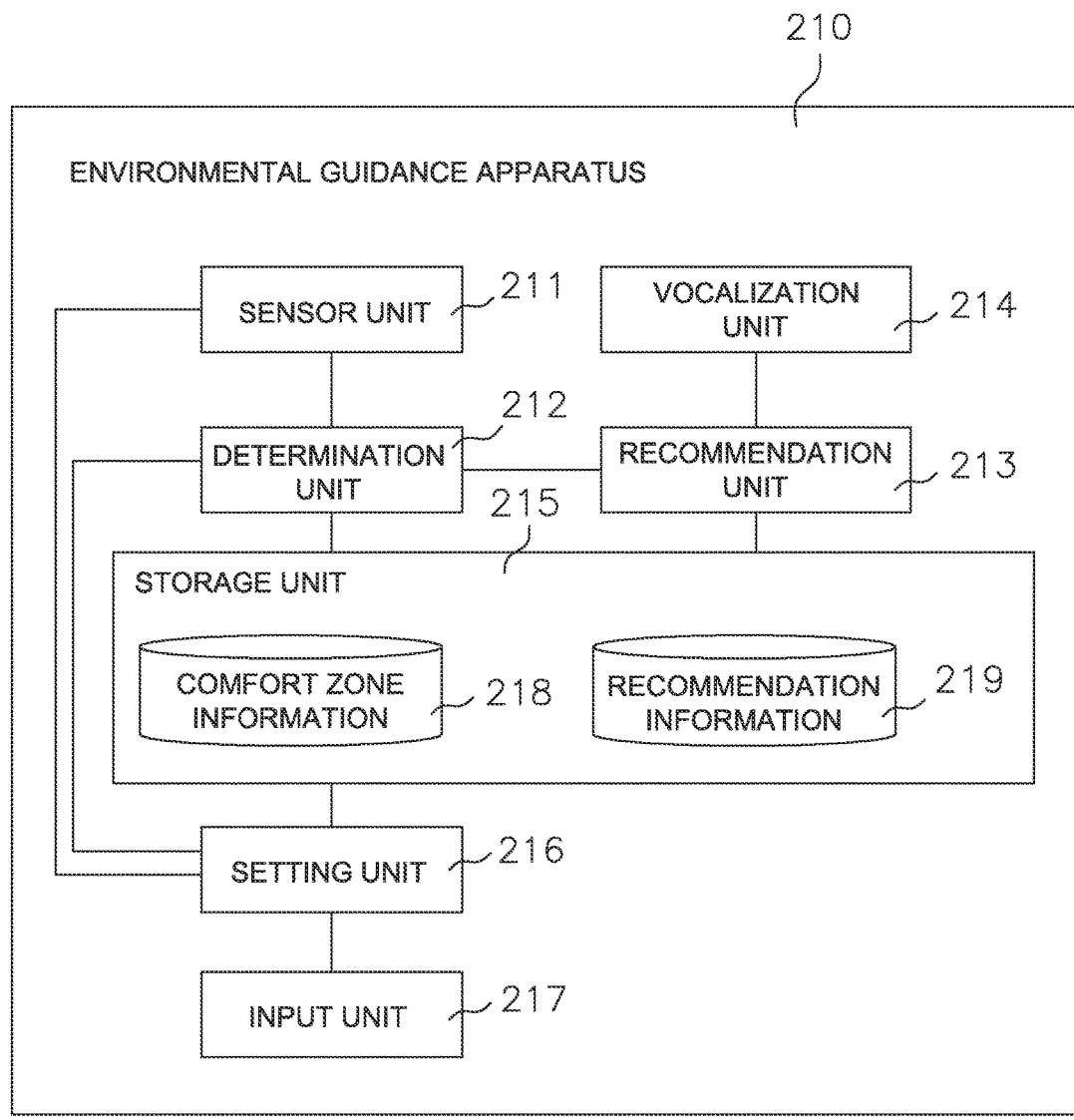
FIG. 16 is a block diagram of the environmental guidance apparatus according to the third embodiment of the present invention.

FIG. 15 shows a conceptual diagram of an environmental guidance apparatus 210 according to the third embodiment of the present invention. In addition, FIG. 16 shows a block diagram of the constituent elements of the environmental guidance apparatus 210 according to the third embodiment of the present invention. The environmental guidance apparatus 210 shown in FIG. 15 is principally installed in the room RM and is portable. As shown in FIG. 15, the external form of the environmental guidance apparatus 210 takes the form of, for example, PICHON-KUN.

<Configuration of the Environmental Guidance Apparatus 210>

As shown in FIG. 16, the environmental guidance apparatus 210 shown in FIG. 15 principally comprises a sensor unit 211, a determination unit 212, a recommendation unit 213, a vocalization unit 214, and a storage unit 215.

The sensor unit 211 shown in FIG. 16 senses the air environment of the room RM (refer to FIG. 15). The determination unit 212 receives the information about the air environment of the room RM from the sensor unit 211. The determination unit 212 references the storage unit 215 and acquires comfort zone information 218. Based on the information about the air environment of the room RM, the determination unit 212 determines whether the air environment of the room RM is within the range of the comfort zone. The recommendation unit 213 receives information about the determination result of the determination unit 212 and information about the air environment of the room RM from the determination unit 212. Here, the information about the determination result of the determination unit 212 is information about whether the air environment of the room RM is within the range of the comfort zone. The recommendation unit 213 references the storage unit 215 and acquires recommendation information 219. Based on the information about the determination result of the determination unit 212 and the information about the air environment of the room RM, the recommendation unit 213 recommends a method of improving the air environment of the room RM so that it falls within the range of the comfort zone. The vocalization unit 214 receives information about the improving method from the recommendation unit 213. Based on the information about the improving method recommended by the recommendation unit 213, the vocalization unit 214 reports the improving method by using speech. Namely, guidance is provided on the air environment of the room RM.

<Configuration of the Comfort Zone Information 218>

The comfort zone information 218 shown in FIG. 16 indicates various cases in which the air environment of the room RM is within the range of the comfort zone. The comfort zone information 218 is, for example, the information shown in FIG. 18. As shown in FIG. 18, the comfort zone information 218 principally comprises an environment field 218A, a lower limit field 218B, and an upper limit field 218C. Referencing the comfort zone information 218 shown in FIG. 18, it can be seen that, for example, the temperature comfort zone is 20°-26° C. Alternatively, it can be seen that, for example, the humidity comfort zone is 40%-70%. Alternatively, it can be seen that, for example, the comfort zone of the dew point temperature differential is greater than or equal to 4° C. Here, the dew point temperature differential is derived by the equation below.

$$\text{Dew point temperature differential} = (\text{Room temperature}) - (\text{Dew point temperature}) \quad (1)$$

Alternatively, it can be seen that, for example, the $CO_2$ concentration comfort zone is 1,000 ppm or less.

<Configuration of the Recommendation Information 219>

The recommendation information 219 shown in FIG. 16 constitutes the candidates for the details recommended by the recommendation unit 213. The recommendation information 219 is, for example, the information shown in FIG. 19. As shown in FIG. 19, the recommendation information 219 principally comprises an environment field 219A, a lower limit field 219B, an upper limit field 219C, and a guidance details field 219D. Referencing the recommendation information 219 shown in FIG. 19, a guidance of the air conditioner (not shown) operation method such as "please set the temperature to 24° C." is provided when, for example, the temperature is greater than or equal to 27° C. Here, the air conditioner conditions the air environment of the room RM. Alternatively, a guidance of the air conditioner not shown) operation method such as "please set the temperature to 24° C." is provided when, for example, the temperature is less then 19° C. or less. Alternatively, a guidance of the air conditioner operation method such as "please perform dehumidifying operation with 'low' airflow" is provided when, for example, the dew point temperature differential is greater than or equal to 4° C. Alternatively, a guidance of the air conditioner operation method such as "please perform dehumidifying operation with 'high' airflow" is provided when, for example, the dew point temperature differential is 0°-4° C. Alternatively, a guidance of the ventilation method such as "please open the window for two minutes" is provided when, for example, the dew point temperature differential is 0° C. or less. Alternatively, a guidance of the ventilation method such as "please open the window for five minutes" is provided when, for example, the $CO_2$ concentration is greater than or equal to 3,000 ppm. Alternatively, a guidance of the ventilation method such as "please open the window for two minutes" is provided when, for example, the $CO_2$ concentration is 1,550-3,000 ppm.

<Flow of the Process Wherein the Environmental Guidance Apparatus 210 Provides Guidance on the Air Environment of the Room RM>

The flow of the process wherein the environmental guidance apparatus 210 shown in FIG. 15 provides guidance on the air environment of the room RM will now be explained using the flow chart shown in FIG. 17.

Figure 17:
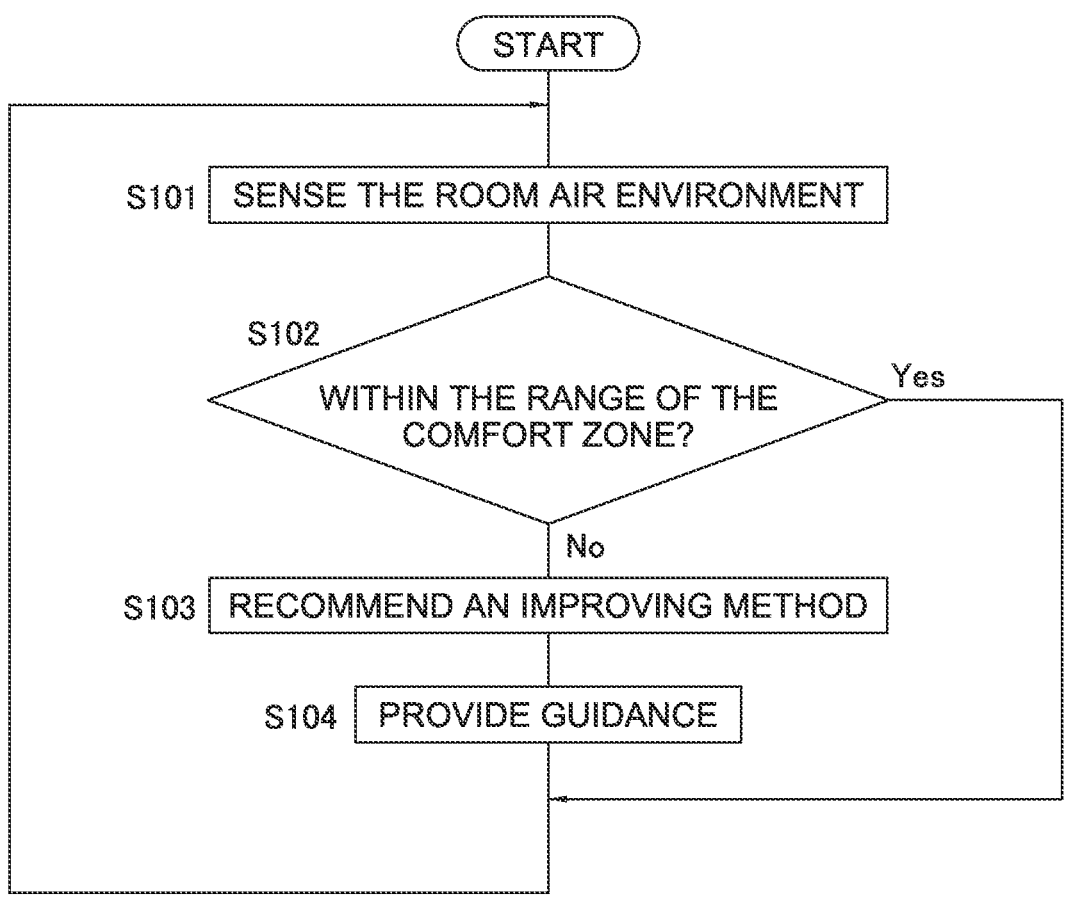
FIG. 17 is a flow chart that shows the flow of a process wherein the environmental guidance apparatus provides guidance on the air environment of the room.

In step S101 shown in FIG. 17, the air environment of the room RM shown in FIG. 15 is sensed. Namely, the sensor unit 211 shown in FIG. 16 senses the air environment of the room RM.

In step S102 shown in FIG. 17, it is determined whether the air environment of the room RM shown in FIG. 15 is within the range of the comfort zone. Namely, the determination unit 212 of the environmental guidance apparatus 210 shown in FIG. 16 receives information about the air environment of the room RM from the sensor unit 211. The determination unit 212 references the storage unit 215 and acquires the comfort zone information 218. The determination unit 212 determines whether the air environment of the room RM is within the range of the comfort zone based on the information about the air environment of the room RM. If it is determined that the air environment of the room RM is within the range of the comfort zone, then the process proceeds to step S101; if it is determined that the air environment of the room RM is not within the range of the comfort zone, then the process proceeds to step S103.

In step S103 shown in FIG. 17, the improving method is recommended. Namely, the recommendation unit 213 of the environmental guidance apparatus 210 shown in FIG. 16 receives the information about the determination result of the determination unit 212 and information about the air environment of the room RM from the determination unit 212. Here, the information about the determination result of the determination unit 212 is the information about whether the air environment of the room RM is within the range of the comfort zone. The recommendation unit 213 references the storage unit 215 and acquires the recommendation information 219. Based on the information about the determination result of the determination unit 212 and the information about the air environment of the room RM, the recommendation unit 213 recommends a method of improving the air environment of the room RM so that it falls within the range of the comfort zone.

In step S104 shown in FIG. 17, guidance is provided. Namely, the vocalization unit 214 of the environmental guidance apparatus 210 shown in FIG. 16 receives information about the improving method from the recommendation unit 213. Based on the information about the improving method recommended by the recommendation unit 213, the vocalization unit 214 reports the improving method by using speech. Thereby, guidance is provided on the air environment of the room RM.

<Features Related to the Environmental Guidance Apparatus 210>

(1) Here, the sensor unit 211 shown in FIG. 16 senses the air environment of the room RM. The determination unit 212 receives information about the air environment of the room RM from the sensor unit 211. The determination unit 212 determines whether the air environment of the room RM is within the range of the comfort zone based on the information about the air environment of the room RM. The recommendation unit 213 receives information about the determination result of the determination unit 212 and information about the air environment of the room RM from the determination unit 212. Based on the information about the determination result of the determination unit 212 and the information about the air environment of the room RM, the recommendation unit 213 recommends a method of improving the air environment of the room RM on that it falls within the range of the comfort zone.

Accordingly, it is possible to create a sufficiently comfortable air environment in the room RM.

(2) Here, the vocalization unit 214 receives information about the improving method from the recommendation unit 213. Based on the information about the improving method recommended by the recommendation unit 213, the vocalization unit 214 reports the improving method by using speech.

Accordingly, it is possible to easily ascertain the improving method.

(3) Here, the air environmental factors of the room RM shown in FIG. 15 are the temperature, the dew point temperature differential, the humidity, and the $CO_2$ (carbon dioxide) concentration of the room RM (refer to FIG. 18).

Accordingly, it is possible to make a detailed recommendation for a method of improving the air environment of the room RM so that it falls within the range of the comfort zone.

(4) Here, the improving methods are the ventilation method and the air conditioner operation method (refer to FIG. 19).

Accordingly, it is possible to finely create a comfortable air environment in the room RM.

(5) Here, the air conditioner operation method is an improving method that encompasses the operation mode, the set temperature, and the set airflow of the air conditioner.

Accordingly, it is possible to more finely create a comfortable air environment in the room RM.

Modified Example of the Third Embodiment (A) The air environmental factor of the room RM shown in FIG. 15 may be at least one of the temperature, the dew point temperature differential, the humidity, the atmospheric pressure, the airflow, the toxic substance concentration, the dust concentration, and the negative ion concentration of the room RM. Here, toxic substances may be at least one of, for example, carbon monoxide, carbon dioxide, allergens, mites, mold, formaldehyde, organic compounds, VOCs (volatile organic compounds), and endocrine disrupters. The sensor unit 211 shown in FIG. 16 may sense the dew point temperature differential of the room RM by measuring the temperature, the humidity, and the atmospheric pressure of the room RM, deriving the dew point temperature of the room RM therefrom, and then deriving the dew point temperature differential of the room RM. In addition, the sensor unit 211 shown in FIG. 16 senses the temperature, the humidity, and the atmospheric pressure of the room RM, and, based on that information, the determination unit 212 may determine the weather and the vocalization unit 214 may provide guidance on the weather forecast. The information about the air environment of the room RM, which is sensed by the sensor unit 211, may be accumulated in the storage unit 215. Furthermore, the information about the air environment of the room RM stored in the storage unit 215 may be analyzed. The vocalization unit 214 shown in FIG. 16 may report the improving method via, for example, a speaker (not shown) that is installed in the vicinity of a mouth 231 of PICHON-KUN (refer to FIG. 15). Based on the determination result of the determination unit 212, the recommendation unit 213 may recommend a method of improving the air environment of the room RM so that it falls within the range of the comfort zone. In this case, the lower limit field 219B and the upper limit field 219C shown in FIG. 19 may be omitted. Regardless of whether the air environment of the room RM is above or below the comfort zone, the details for which guidance is provided if the air environment of the room RM deviates from the comfort zone may be stored in the guidance details field 219D.

(B) The air environmental factors of the room RM shown in FIG. 15 may be at least two of the temperature, the dew point temperature differential, the humidity, the atmospheric pressure, the airflow, the toxic substance concentration, the dust concentration, and the negative ion concentration of the room RM. Here, toxic substances may be at least one of for example, carbon monoxide, carbon dioxide, allergens, mites, mold, formaldehyde, organic compounds, VOCs (volatile organic compounds), and endocrine disrupters. In this case, the determination unit 212 shown in FIG. 16 may assign a priority order to the plurality of air environmental factors of the room RM, and may determine whether the air environment of the room RM is within the range of the comfort zone based on information about the air environment of the room RM. For example, if the priority order is the temperature of the room RM and the dew point temperature differential of the room RM in that order, then, as long as the temperature of the room RM is within the range of the comfort zone, the determination unit 212 determines that the air environment of the room RM is within the range of the comfort zone even if the dew point temperature differential of the room RM is not within the range of the comfort zone. Thereby, it is possible to create a comfortable environment in the room RM while giving priority to those air environmental factors of the room RM that are important (e.g., the temperature of the room RM).

(C) The air environmental factors of the room RM shown in FIG. 15 may be at least two of the temperature, the dew point temperature differential, the humidity, the atmospheric pressure, the airflow, the toxic substance concentration, the dust concentration, and the negative ion concentration of the room RM. Here, toxic substances may be at least one of for example, carbon monoxide, carbon dioxide, allergens, mites, mold, formaldehyde, organic compounds, VOCs (volatile organic compounds), and endocrine disrupters. In this case, the recommendation unit 213 shown in FIG. 16 may assign a priority order to the plurality of air environmental factors of the room RM, and, based on the information about the determination result of the determination unit 212 and the information about the air environment of the room RM, may recommend a method of improving the air environment of the room RM on that it falls within the range of the comfort zone. Let us consider an example of a case wherein the priority order is the temperature of the room RM and the dew point temperature differential of the room RM in that order. As shown in 19, a guidance of the air conditioner operation method such as "please perform operation with the temperature set to 24° C." is provided if the room RM temperature is 19° C. or less. However, a guidance of the ventilation method such as "please open the window for two minutes" is provided if the dew point temperature differential of the room RM is 0° C. or less. In this case, if the window is opened regardless of whether the room RM temperature is below the comfort zone, then the temperature of the room RM will fall even further below the comfort zone. Accordingly, instead of using the guidance details of "please open the window for two minutes," the recommendation unit 213 provides guidance on just the air conditioner operation method of "please set the temperature to 24° C." Accordingly, a priority order is assigned to a plurality of air environmental factors and a recommendation is made on a method of improving the air environment of the room RM so that it falls within the range of the comfort zone, and therefore, if there is a plurality of improving methods, a coordinated recommendation can be made.

(D) The air conditioner (not shown) operation method of the improvement methods recommended by the recommendation unit 213 shown in FIG. 16 may be an improvement method for at least one of the operation mode, the set temperature, the set humidity, the set airflow, the set wind direction, the amount of dehumidification, the amount of humidification, the amount of ventilation, and the air cleaning performance of the air conditioner. Accordingly, it is possible to recommend an improving method for at least one of the operation mode, the set temperature, the set humidity, the set airflow, the set wind direction, the amount of dehumidification, the amount of humidification, the amount of ventilation, and the air cleaning performance of the air conditioner, and it is therefore possible to finely create a comfortable air environment in the room RM.

(E) As shown in FIG. 16, the environmental guidance apparatus 210 shown in FIG. 15 may comprise a setting unit 216 and an input unit 217. Namely, a sense of comfort with respect to the air environment of the room RM is input to the input unit 217. The setting unit 216 receives the information about the sense of comfort from the input unit 217. The setting unit 216 sets the comfort zone of the air environment of the room RM based on the information about the sense of comfort. The storage unit 215 receives the information about the comfort zone, which was set by the setting unit 216, from the setting unit 216. The storage unit 215 stores the comfort zone, which was set by the setting unit 216. Namely, the setting unit 216 overwrites the comfort zone information 218 of the storage unit 215 by replacing the default information with the comfort zone information set by the setting unit 216.

The fact that the environment is comfortable may be input to the input unit 217 by, for example, pressing a forehead 234 or a stomach 233, or by shaking a hand 232 of the environmental guidance apparatus 210 (PICHON-KUN) shown in FIG. 15. Alternatively, such an input may be made to the input unit 217 by saying, for example, "I'm comfortable," via a voice device such as a microphone. The present embodiment differs from the third embodiment on these points.

In addition, the flow of the process wherein the environmental guidance system 210 shown in FIG. 15 provides guidance on the air environment of the room RM differs from the third embodiment on the following points. Furthermore, processes in the flow chart shown in FIG. 20 that are the same as those shown in FIG. 17 are assigned the same reference numbers.

Figure 20:
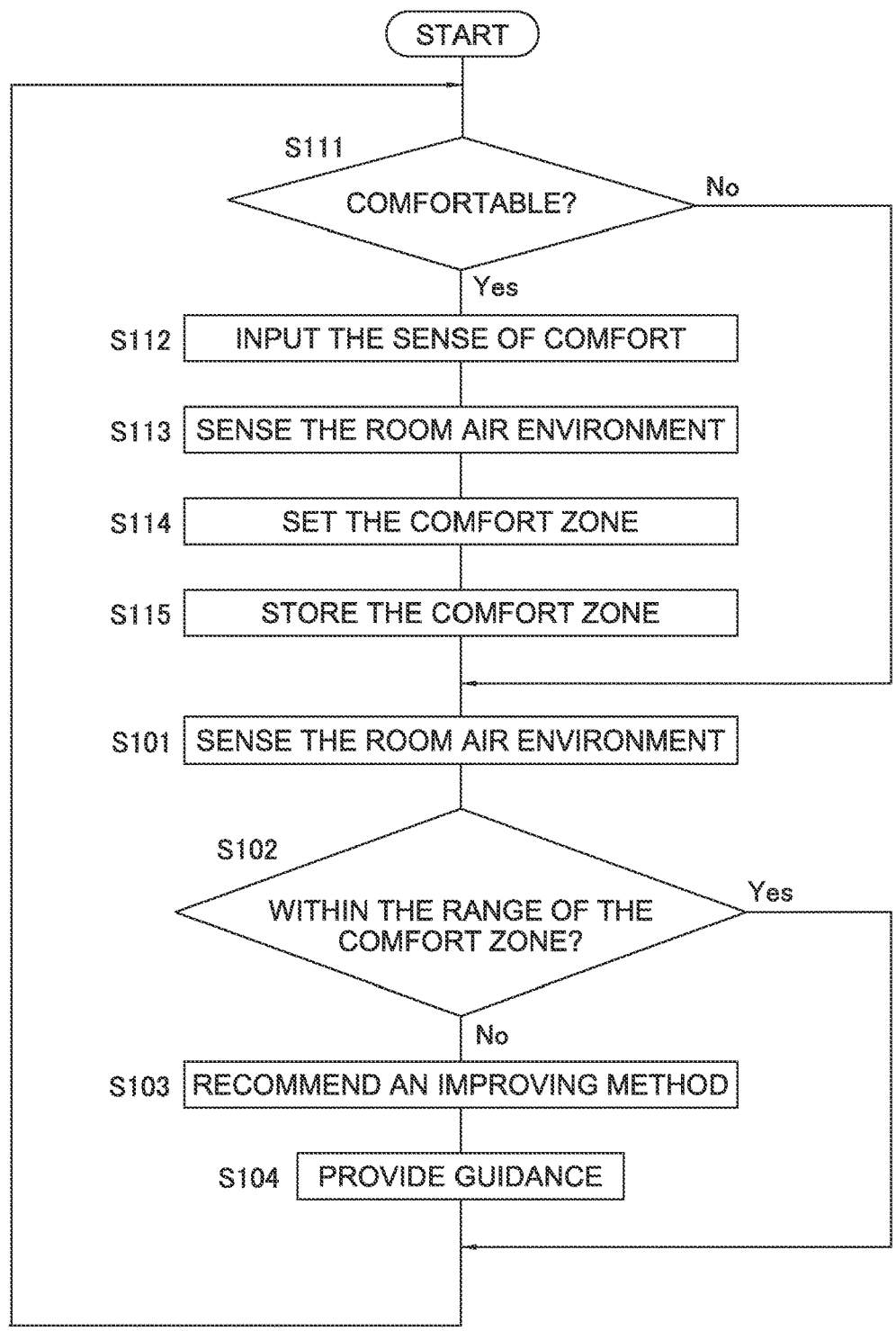
FIG. 20 is a flow chart that shows a modified example of the flow of the process wherein the environmental guidance apparatus provides guidance on the air environment of the room.

In step S111 shown in FIG. 20, the user (not shown) of the environmental guidance apparatus 210 shown in FIG. 15 determines whether the air environment of the room RM is comfortable. The process proceeds to step S112 if it is determined that it is comfortable, or proceeds to step S101 if it is determined that it is not comfortable.

In step S112 shown in FIG. 20, the user of the environmental guidance apparatus 210 shown in FIG. 15 inputs the sense of comfort with respect to the air environment of the room RM. Namely, the sense of comfort with respect to the air environment of the room RM is input to the input unit 217 of the environmental guidance apparatus 210 shown FIG. 16. The setting unit 216 receives the information about the sense of comfort from the input unit 217.

In step S113 shown in FIG. 20, the air environment of the room RM shown in FIG. 15 is sensed. Namely, the sensor unit 211 of the environmental guidance apparatus 210 shown in FIG. 16 senses the air environment of the room RM. The setting unit 216 receives the information about the air environment of the room RM from the sensor unit 211.

In step S114 shown in FIG. 20, the comfort zone of the air environment of the room RM shown in FIG. 15 is set. Namely, the setting unit 216 shown in FIG. 16 sets the comfort zone of the air environment of the room RM based on the information about the sense of comfort and information about the air environment of the room RM. For example, if it is comfortable when the temperature of the room RM is 21° C., then the center of the zone of 20°-26° C. (refer to FIG. 18), which is the temperature comfort zone of the room RM, is shifted from 23° C. to 21° C., and the temperature comfort zone of the room RM is set to 18°-24° C.

In step S115 shown in FIG. 20, the comfort zone of the air environment of the room RM shown in FIG. 15 is stored. Namely, the storage unit 215 shown in FIG. 16 receives the information about the comfort zone, which was set by the setting unit 216, from the setting unit 216. The storage unit 215 stores the comfort zone that was set by the setting unit 216. Namely, the storage unit 215 overwrites the comfort zone information 218 by replacing the default information with the comfort zone information set by the setting unit 216.

Accordingly, the comfort zone of the air environment of the room RIM shown in FIG. 15 is set based on the information about the user's sense of comfort, and it is therefore possible to set the comfort zone for each user. Consequently, it is possible to create a comfortable air environment in the room RM in accordance with the user's preference. In addition, the comfort zone set by the setting unit 216 (refer to FIG. 16) is stored, and it is therefore possible to reference the information about the comfort zone set by the setting unit 216. Consequently, it is possible to recommend a method of improving the air environment of the room RM so that it falls within the range of the user's preferred comfort zone.

Furthermore, step S115 shown in FIG. 20 may be omitted. In this case, the comfort zone is modified only when the sense of comfort is input to the input unit 217 shown in FIG. 16, and, at other times, the comfort zone information 218 is set to the default information about the comfort zone. In this case, the comfort zone information 218 remains set to the default information and is not overwritten. The comfort zone information set by the setting unit 216 is passed to the determination unit 212 without going through the storage unit 215.

In addition, the fact that the environment is uncomfortable may be input to the input unit shown in FIG. 16. In this case, the setting unit 216 may set the comfort zone of the air environment of the room RM on that it deviates from the air environment considered to be uncomfortable.

(F) The external form of the environmental guidance apparatus 210 shown in FIG. 15 need not be that of PICHON-KUN. For example, as long as it is portable, it may be: a stuffed animal; a folding chair, a table, or the like; a picture frame with a picture in it, or the like; or a desk lamp, a pencil box, or the like.

Fourth Embodiment

Figure 21:
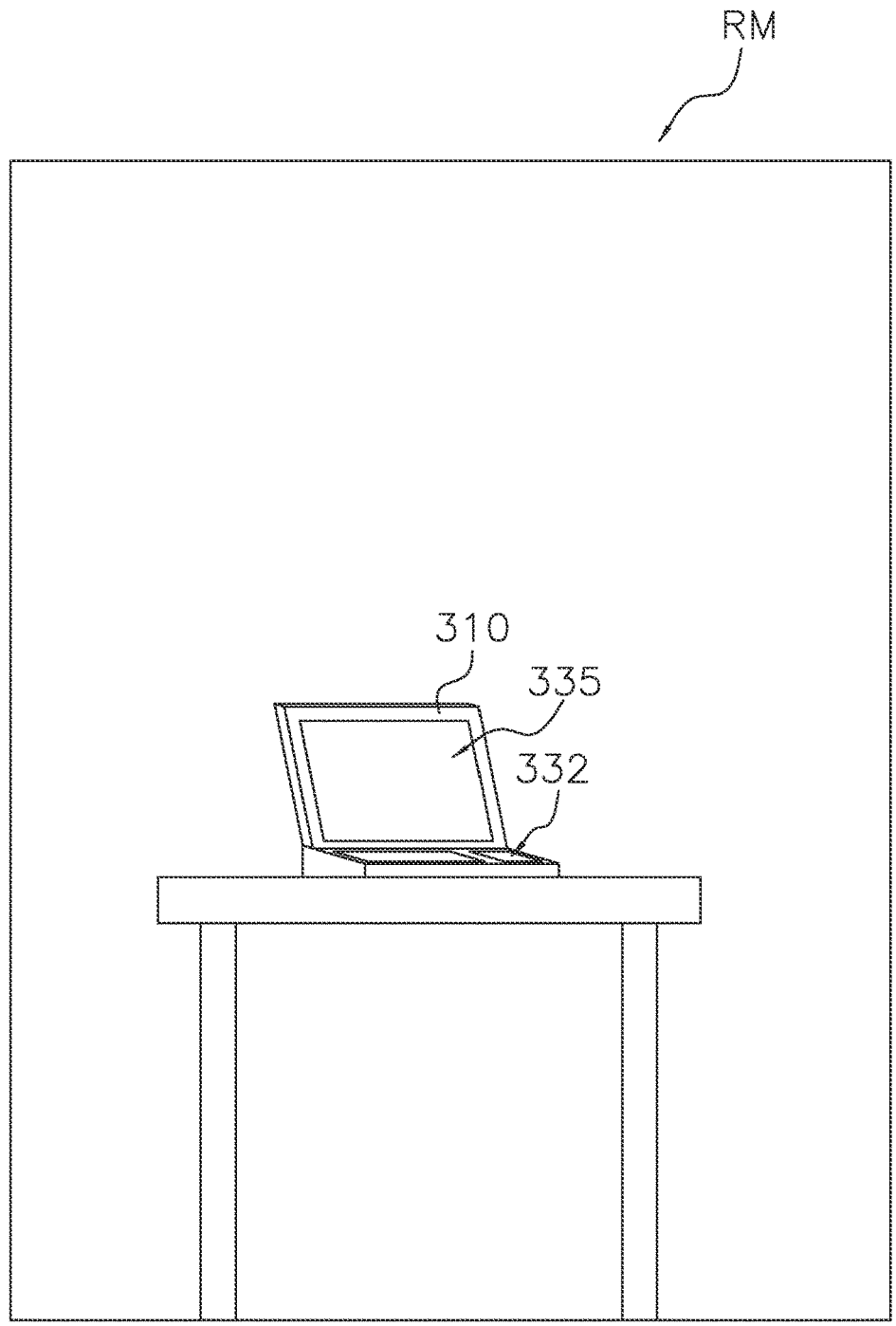
FIG. 21 is a conceptual diagram of an environmental guidance apparatus according to a fourth embodiment of the present invention.
Figure 22:
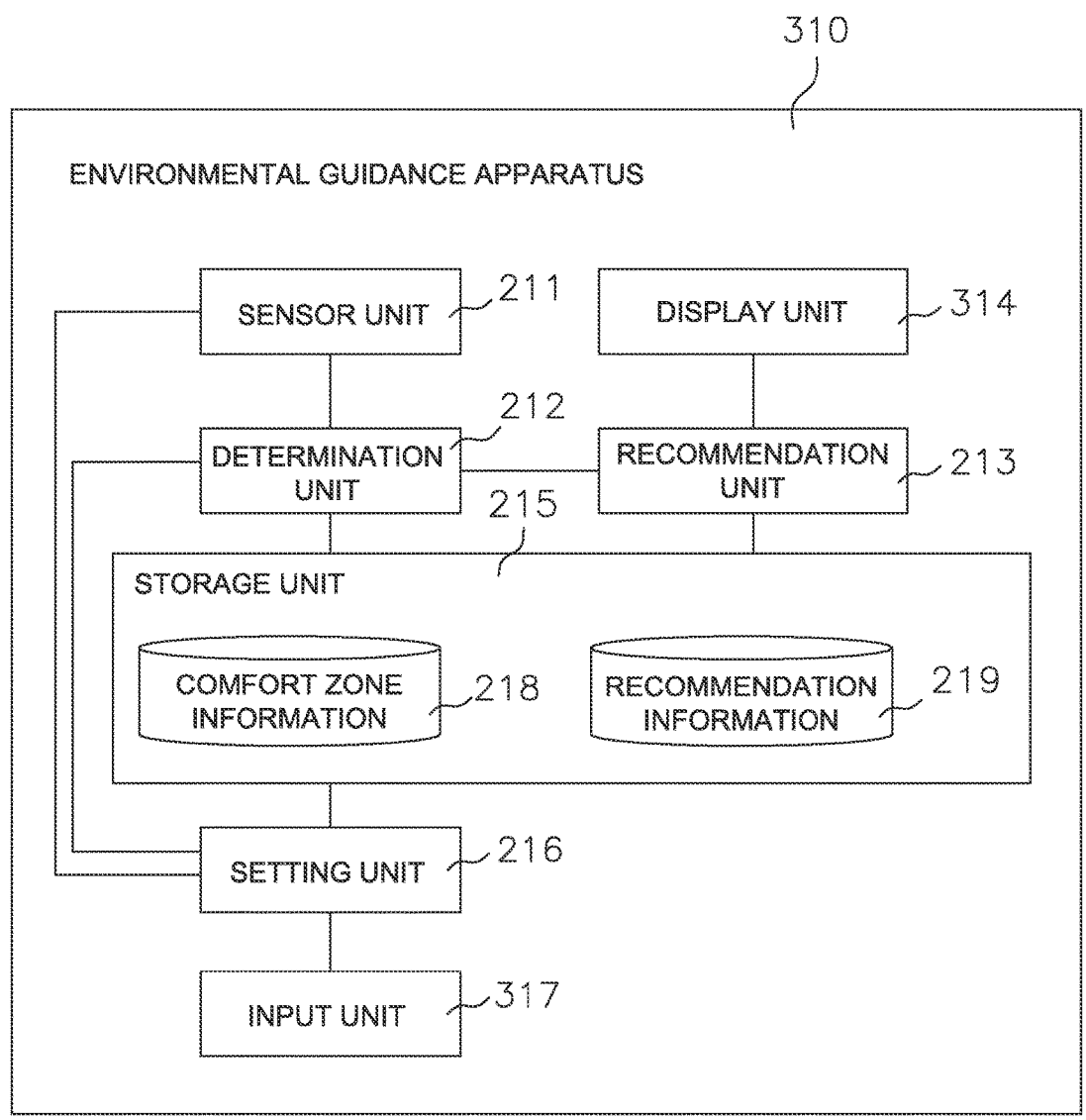
FIG. 22 is a block diagram of the environmental guidance apparatus according to the fourth embodiment of the present invention.

FIG. 21 shows a conceptual diagram of an environmental guidance apparatus 310 according to the fourth embodiment of the present invention. In addition, FIG. 22 shows a block diagram of the constituent elements of the environmental guidance apparatus 310 according to the fourth embodiment of the present invention. Constituent elements of the environmental guidance apparatus 310 in FIGS. 21 and 22 that are the same as those of the environmental guidance apparatus 210 in FIG. 15 and FIG. 16 are assigned the same reference numbers. The environmental guidance apparatus 310 shown in FIG. 21 is principally installed in the room RM and is portable. The environmental guidance apparatus 310 is, for example, a notebook computer.

As shown in FIG. 21 and FIG. 22, the environmental guidance apparatus 310 has the same basic structure as that of the third embodiment and its constituent elements are the same as those in FIG. 16, but, as shown in FIG. 22, differs from the third embodiment in that the environmental guidance apparatus 310 comprises a display unit 314 instead of the vocalization unit 214 (refer to FIG. 16). Namely, the display unit 314 shown in FIG. 22 receives information about the improving method from the recommendation unit 213. Based on the information about the improving method recommended by the recommendation unit 213, the display unit 314 reports the improving method by displaying such on a screen 335 (refer to FIG. 21). Accordingly, it is possible to easily ascertain the improving method because it is reported by displaying it on the screen 335.

The point that a recommendation is made on a method of improving the air environment of the room RM so that it falls within the range of the comfort zone is the same as in the third embodiment. Accordingly, it is also possible to create a sufficiently comfortable air environment in the room RM by such an environmental guidance apparatus 310.

Modified Example of the Fourth Embodiment

An input unit 317 shown in FIG. 22 may be a keyboard 332, which is shown in FIG. 21. In this case, detailed information concerning the sense of comfort with respect to the air environment of the room RM can be input. In addition, the environmental guidance apparatus 310 may be a mobile information terminal other than a notebook computer. For example, as long as it is portable, it may be a mobile telephone or an electronic organizer.

The environmental control apparatus, the environmental control system, the environmental control method, and the environmental control program according to the present invention are effective in that they can create a sufficiently comfortable air environment in a room, and are therefore useful for environmental control.

What is claimed is:

1. An environmental control apparatus that is installed in a room and is portable, comprising:
   a sensor configured to sense an air environment of the room; and
   a computer programmed
   to receive input of a fact that the air environment of the room is comfortable to a user;
   to receive input of a sense of comfort with respect to the air environment of the room by the user only when the fact that the air environment of the room is comfortable to the user is input by the user;
   to set a range of a comfort zone of the air environment of the room based on information about the sense of comfort that is input by the user and an air environmental factor of the air environment of the room sensed with the sensor;
   to determine whether the air environment of the room is within the range of the comfort zone based on information about the air environment of the room sensed with the sensor, the comfort zone being determined for each user and the comfort zone being modified by shifting a center of the comfort zone based on the information about the sense of comfort that is input by the user only when the sense of comfort is input by the user, and generate a control signal to operate the environmental control apparatus such that the air environment of the room falls within the range of the modified comfort zone; and
   to output information or a signal in order to recommend to the user an improving method of improving the air environment of the room based on at least information about a determination result of whether the air environment of the room is within the range of the comfort zone so that the air environment of the room falls within the range of the comfort zone.

2. The environmental control apparatus as recited in claim 1, wherein
   the computer is further programmed to report the improving method by using speech based on information about the improving method that was recommended by the computer.

3. The environmental control apparatus as recited in claim 1, further comprising
   a display configured to display the improving method on a screen based on information about the improving method that was recommended by the computer.

4. The environmental control apparatus as recited in claim 1, wherein
   the air environmental factor of the room includes at least one of temperature, dew point temperature differential, humidity, atmospheric pressure, airflow, toxic substance concentration, dust concentration, and negative ion concentration of the room.

5. The environmental control apparatus as recited in claim 1, wherein
   the air environmental factor of the room includes at least two of temperature, dew point temperature differential, humidity, atmospheric pressure, airflow, toxic substance concentration, dust concentration, and negative ion concentration of the room, and
   the computer assigns a priority order to the air environmental factor of the room, and determines whether the air environment of the room is within the range of the comfort zone based on information about the air environmental factor of the room.

6. The environmental control apparatus as recited in claim 1, wherein
   the air environmental factor of the room includes at least two of temperature, dew point temperature differential, humidity, atmospheric pressure, airflow, toxic substance concentration, dust concentration, and negative ion concentration of the room, and
   the computer assigns a priority order to the air environmental factor of the room, and recommends, based on at least the information about the determination result of whether the air environment of the room is within the range of the comfort zone, a method of improving the air environment of the room so that it falls within the range of the comfort zone.

7. The environmental control apparatus as recited in claim 1, wherein
   the improving method includes at least one of a ventilation method and an operation method of an air conditioner that conditions the air environment of the room.

8. The environmental control apparatus as recited in claim 7, wherein
   the operation method of the air conditioner is an improving method for at least one of an operation mode, a set temperature, a set humidity, a set airflow, a set wind direction, an amount of dehumidification, an amount of humidification, an amount of ventilation, and an air cleaning performance of the air conditioner.

9. The environmental control apparatus as recited in claim 1, wherein
the computer includes storage configured to store the comfort zone that was set by the computer.

10. The environmental control apparatus as recited in claim 9, wherein
the computer sets the range of the comfort zone for each of the users,
the comfort zone set with the computer for each of the users is stored in the storage.

11. The environmental control apparatus as recited in claim 1, wherein
the sense of comfort is input before the air environmental factor of the air environment of the room is sensed with the sensor.

12. The environmental control apparatus as recited in claim 1, wherein
the computer recommends the improving method for the user.

13. An environmental control system, comprising:
the environmental control apparatus as recited in claim 1; and
an air conditioner configured to condition the air environment of the room based on information received from the environmental control apparatus so that the air environment of the room falls within the range of the comfort zone.

14. An environmental control method wherein an apparatus, which is installed in a room and is portable, controls an air environment of the room, comprising:
sensing the air environment of the room;
inputting a fact that the air environment of the room is comfortable to a user with a first input unit;
inputting a sense of comfort with respect to the air environment of the room to a second input unit by the user only when the user inputs the fact that the air environment of the room is comfortable to the user with the first input unit;
setting a range of a comfort zone of the air environment of the room based on information about the sense of comfort that is input by the user and an air environmental factor of the air environment of the room that is sensed;
determining whether the air environment of the room is within the range of the comfort zone based on information about the air environment of the room that is sensed, the comfort zone being determined for each user and the comfort zone being modified by shifting a center of the comfort zone based on the information about the sense of comfort that is input by the user only when the sense of comfort is input by the user, and generating a control signal to operate the environmental control apparatus such that the air environment of the room falls within the range of the modified comfort zone; and
recommending to the user an improving method of improving the air environment of the room based on at least information about a determination result that is determined so that the air environment of the room falls within the range of the comfort zone.

15. A non-transitory computer readable medium with an environmental control program stored thereon that causes an apparatus having a processor, which is installed in a room and is portable, to control an air environment of the room, comprising instructions for performing:
sensing the air environment of the room;
inputting a fact that the air environment of the room is comfortable to a user with a first input unit;
inputting a sense of comfort with respect to the air environment of the room to a second input unit by the user only when the user inputs the fact that the air environment of the room is comfortable to the user with the first input unit;
setting a range of a comfort zone of the air environment of the room based on information about the sense of comfort that is input by the user and an air environmental factor of the air environment of the room that is sensed;
determining whether the air environment of the room is within the range of the comfort zone based on information about the air environment of the room that is sensed, the comfort zone being determined for each user and the comfort zone being modified by shifting a center of the comfort zone based on the information about the sense of comfort that is input by the user only when the sense of comfort is input by the user, and generating a control signal to operate the environmental control apparatus such that the air environment of the room falls within the range of the modified comfort zone; and
recommending to the user an improving method of improving the air environment of the room based on at least information about a determination result that is determined so that the air environment of the room falls within the range of the comfort zone.

* * * * *